United States Patent [19]

Mizuno

[11] Patent Number: 5,038,389
[45] Date of Patent: Aug. 6, 1991

[54] ENCODING OF A PICTURE SIGNAL IN CONSIDERATION OF CONTRAST IN EACH PICTURE AND DECODING CORRESPONDING TO THE ENCODING

[75] Inventor: Shoji Mizuno, Tokyo, Japan
[73] Assignee: NEC Corporation, Japan
[21] Appl. No.: 210,836
[22] Filed: Jun. 24, 1988

[30] Foreign Application Priority Data

Jun. 25, 1987 [JP] Japan .................................. 62-159331
Jun. 25, 1987 [JP] Japan .................................. 62-159332
Jul. 7, 1987 [JP] Japan .................................. 62-170185

[51] Int. Cl.$^5$ ............................................. G06K 9/36
[52] U.S. Cl. .................................... 382/56; 358/433
[58] Field of Search .............................. 382/50–53, 382/56; 358/133, 433, 455, 464, 466, 467

[56] References Cited

U.S. PATENT DOCUMENTS 4,124,870 11/1978 Schatz et al. ...................... 358/433
4,205,341 5/1980 Mitsuya et al. .................... 358/433
4,319,267 3/1982 Mitsuya et al. .................... 358/433

*Primary Examiner*—Michael Razavi
*Assistant Examiner*—Jose L. Couso
*Attorney, Agent, or Firm*—Ostrolenk, Faber, Gerb & Soffen

[57] ABSTRACT

On encoding an original picture signal comprising signal portions representative of original pictures, respectively, a contrast detecting unit (41) detects a measure of contrast in each picture in response to signal blocks representative of block areas, respectively, which have a common size in the picture in the manner known in transform encoding. Such measures are variable in a predetermined number of stages. With reference to the stages, a picture encoding parameter determiner (72) determines picture encoding parameters. Supplied with the encoding parameters, a picture encoder (71) encodes the original picture signal into an encoded picture signal. Inasmuch as the measures are detected in consideration of the signal blocks, the encoding is carried out on the signal blocks in effect. The contrast detecting unit, as herein called, preferably divides the pictures into a background region and a picture or non-background region so that the encoding parameters are determined with additional reference to the regions. The measures may be detected either among the block areas of each picture or among picture elements of each block area. More preferably, a complexity detecting unit is used in addition to the contrast detecting unit. The picture encoder is typically either a transform encoder or a predictive encoder.

19 Claims, 14 Drawing Sheets

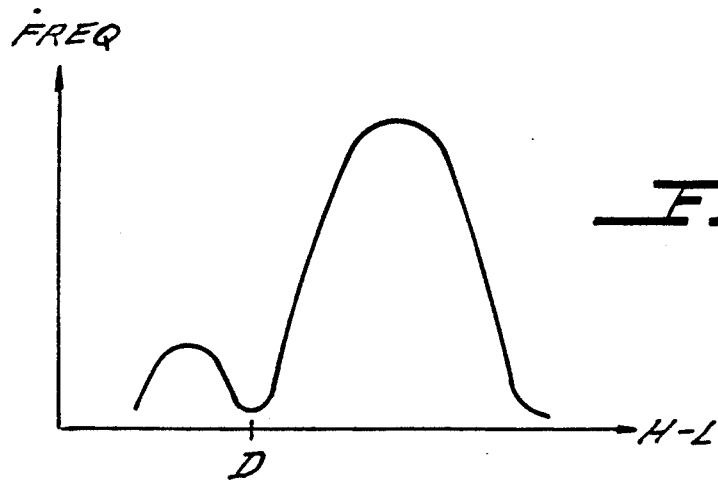
FIG-7-
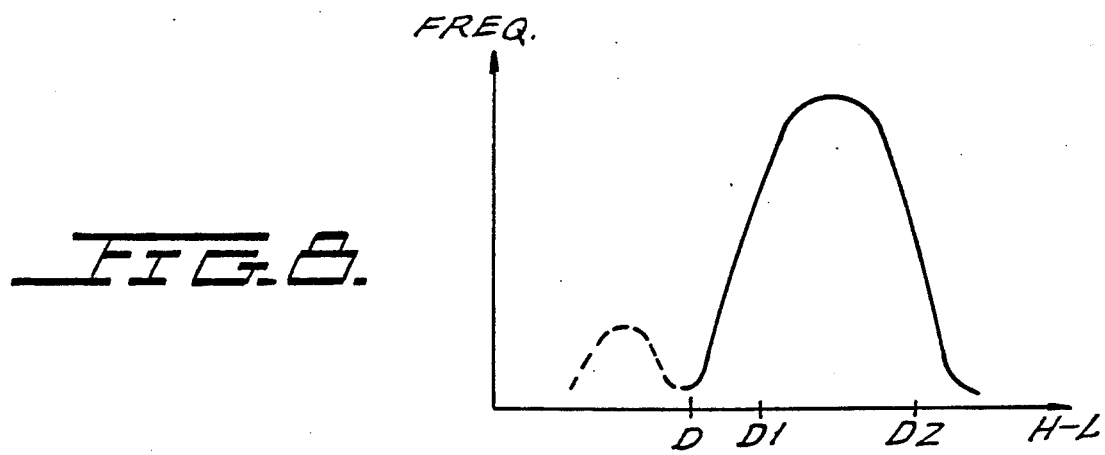
FIG.8.
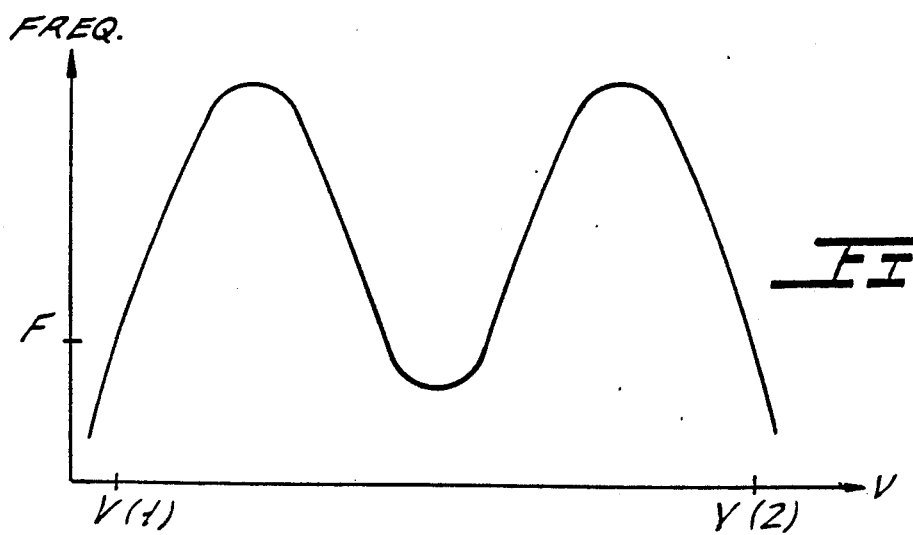
FIG.15.

ENCODING OF A PICTURE SIGNAL IN CONSIDERATION OF CONTRAST IN EACH PICTURE AND DECODING CORRESPONDING TO THE ENCODING

BACKGROUND OF THE INVENTION

This invention relates to a picture signal encoding device for use in encoding an original picture signal with information compression. This invention relates also to a picture signal decoding device for use as a counterpart of the picture signal encoding device.

It will be assumed for the time being that the original picture signal represents a great number of original pictures in succession. Such an original picture signal comprises signal portions or sections representative of the respective original pictures. Merely by way of example, each original picture may represent a fingerprint. Typically, the information compression is achieved either by transform encoding or predictive encoding. The transform encoding is discussed in detail in a book written by William K. Pratt under the title of "Digital Image Processing" and published 1987 by John Wiley and Sons, pages 667 to 699, Section 23.2 entitled "Transform Coding". The predictive encoding is discussed in detail in the book of Pratt, pages 637 to 657, Section 22.5 entitled "Predictive Coding".

The following facts will later be described a little more in detail. When resorted to the transform encoding, the picture signal encoding device includes a dividing circuit for dividing each signal portion or section into signal blocks representative of block areas which are contiguous to one another in each original picture. Each block area is square in outline and consists of a plurality of picture elements, $N \times N$ in number, where N represents a predetermined natural number. The block areas therefore have a common size. The encoding device further includes a picture encoder for encoding the signal blocks into an encoded picture signal with a predetermined encoding characteristic.

Such a transform encoding device comprises a transformer or transform carrying out circuit. The transformer subjects each signal block to a linear transform to produce a transform coefficient signal representative of transform coefficients, $N \times N$ in number. With reference to a selection threshold value, a coefficient selector selects selected coefficients from the transform coefficients. A signal representative of the selected coefficients is encoded into the encoded picture signal. The selection threshold value is used in specifying at least partly the predetermined encoding characteristic. In a counterpart picture signal decoding device, the encoded picture signal is decoded into a reproduced picture signal representative of reproduced pictures which correspond to the respective original pictures.

In a conventional transform encoding device, the selection threshold value is predetermined and is invariable throughout the signal blocks. This adversely affects the reproduced picture signal and consequently the reproduced pictures. An improved transform encoding device is disclosed in an article contributed by Wein-Hsiung Chen et al to IEEE Transactions on Communications, Volume COM—25, No. 11 (Nov. 1977), pages 1285 to 1293, under the title of "Adaptive Coding of Monochrome and Color Images". According to Chen el al, the signal portions are classified into four classes in compliance with magnitudes of alternating-current energy. Different selection threshold values are predetermined for the respective classes. It appears, however, that use of the alternating-current energy magnitudes does not much improve the reproduced pictures.

In a predictive encoding device, no dividing circuit is used. Instead, attention is directed in the respective signal portions or sections to signal elements which represent the respective picture elements of the individual original pictures. On encoding the original picture signal into the encoded picture signal, the signal elements are successively encoded by using a prediction formula which is primarily defined by a plurality of prediction coefficients.

In a conventional predictive encoding device, the prediction coefficients are predetermined and are invariable throughout the signal portions. This adversely affects the reproduced picture signal and hence the reproduced pictures.

SUMMARY OF THE INVENTION

It is therefore an object of the present invention to provide a picture signal encoding device for use in encoding an original picture signal into an encoded picture signal with a best possible picture quality given to a reproduced picture signal which is reproduced in a counterpart picture signal decoding device from the encoded picture signal.

It is another object of this invention to provide a picture signal decoding device for use as a counterpart of the picture signal encoding device described above.

Other objects of this invention will become clear as the description proceeds.

On describing the gist of this invention, it is possible to understand that a picture signal encoding device is for encoding an original picture signal comprising signal portions representative of original pictures, respectively, and includes dividing means for dividing each signal portion into signal blocks and a picture encoder for encoding the signal blocks into an encoded picture signal. The signal blocks represent block areas of a common size in each original picture, respectively.

According to this invention, the above-mentioned picture signal encoding device is characterised by: (1) contrast detecting means responsive to the signal blocks for detecting a measure of contrast in each original picture, the measure being variable from a measure to another measure in a predetermined number of stages, the detecting means thereby producing a contrast stage signal indicative of the stages; (2) determining means responsive to the contrast stage signal for determining encoding parameters with reference to the stages; (3) supplying means for supplying the encoding parameters to the picture encoder to make each of the encoding parameters give the picture encoder a predetermined encoding characteristic; (4) encoding means for encoding the contrast stage signal into an encoded contrast signal; and (5) combining means for combining the encoded picture signal and the encoded contrast signal into a device output signal.

According to this invention, there is provided also a picture signal decoding device which is for use as a counterpart of the picture signal encoding device set forth above to receive the device output signal as a device input signal and which comprises: (1) decomposing means for decomposing the device input signal into a decomposed picture signal and a decomposed contrast signal which are reproductions of the encoded picture signal and the encoded contrast signal; (2) decoding means for decoding the decomposed contrast signal into a decoded contrast signal indicative of the above-mentioned stages; (3) deciding means responsive to the decoded contrast signal for deciding decoding parameters with reference to the stages indicated by the decoded contrast signal, the decoding parameters being identical with the encoding parameters; and (4) a picture decoder responsive to the decoding parameters for decoding the decomposed picture signal into a reproduced picture signal representative of reproductions of the respective original pictures.

According to an aspect of this invention, the above-mentioned contrast detecting means comprises: (A) level difference detecting means responsive to the signal blocks for detecting a level difference between a maximum and a minimum level in each of the signal blocks, the level difference being variable from one of the signal blocks to another of the signal blocks; and (B) block contrast detecting means coupled to the level difference detecting means for detecting the measures of contrast among the block areas of each original picture in compliance with the level differences detected in each signal portion to make the contrast stage signal indicate the stages for the respective signal portions.

According to another aspect of this invention, each of the signal blocks should be understood to consist of signal elements representative of picture elements of one of the block areas that is represented by the signal block under consideration. The afore-mentioned contrast detecting means comprises: (A) level detecting means responsive to each of the signal blocks for detecting levels of the respective signal elements; and (B) element contrast detecting means coupled to the level detecting means for detecting the measures of contrast among the picture elements of each of the block areas in compliance with the levels detected in one of the signal blocks that represents the block area in question, the element contrast detecting means thereby making the contrast stage signal indicate the stages for the respective signal blocks.

According to still another aspect of this invention, each of the signal blocks should be understood to consist of signal elements representative of picture elements of one of the block areas that is represented by the signal block under consideration. The above-mentioned contrast detecting means comprises: (A) level detecting means responsive to each of the signal blocks for detecting levels of the respective signal elements; and (B) element contrast detecting means coupled to the level detecting means for detecting the measures of contrast among the picture elements of each of the block areas in compliance with the levels detected in one of the signal blocks that represents the block area in question, the element contrast detecting means thereby making the contrast stage signal indicate the stages for the respective signal blocks. In this event, the above-understood encoding device further comprises complexity detecting means coupled to the level detecting means for detecting a degree of complexity of each of the block areas in compliance with the levels detected in one of the signal blocks that represents the block area in question, the degree of complexity being variable from one of the block areas to another of the block areas in a predestined number of grades, the complexity detecting means thereby producing a complexity grade signal indicative of the grades for the respective signal blocks. Under the circumstances, the afore-mentioned determining means is furthermore responsive to the complexity grade signal to determine the encoding parameters with reference to the stages and the grades; the encoding means being for furthermore encoding the complexity grade signal into an encoded complexity signal; the combining means being for combining the encoded picture signal, the encoded contrast signal, and the encoded complexity signal into the device output signal.

BRIEF DESCRIPTION OF THE DRAWING

FIG. 7 shows an example of a level difference frequency distribution in an original picture;

FIG. 8 again shows the example depicted in FIG. 7;

FIGS. 3 and 5, shows a matrix of transform coefficients;

FIG. 15, drawn below FIGS. 11 and 12, shows an example of a level frequency distribution in a block area;

FIG. 18 is a block diagram of portions of a picture signal encoding device according to a third practical embodiment of this invention and a counterpart picture signal decoding device.

DESCRIPTION OF THE PREFERRED EMBODIMENTS

Figure 1:
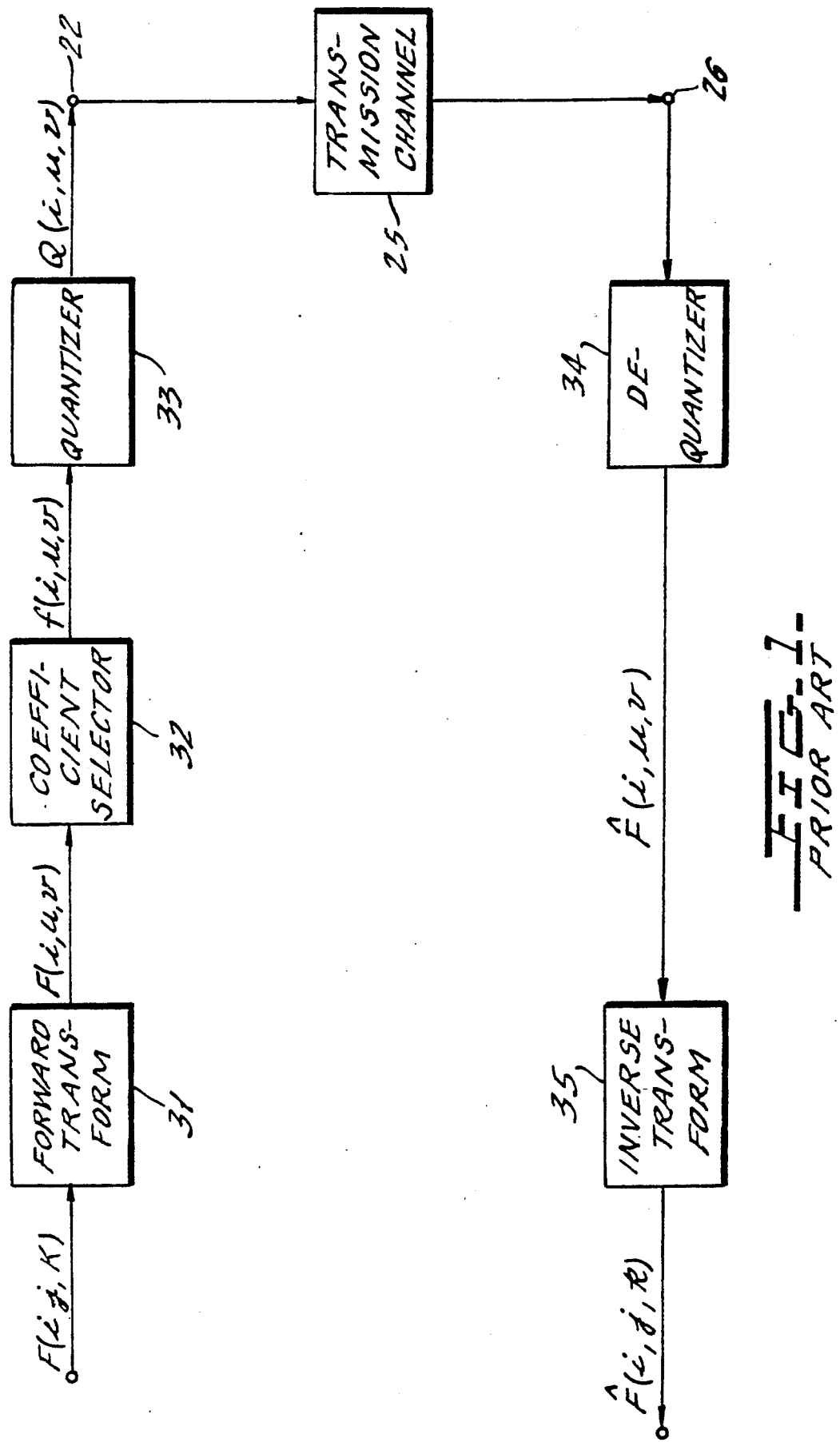
FIG. 1 is a block diagram illustrative of a conventional picture signal encoding device according to transform encoding and a counterpart picture signal decoding device.
Figure 2:
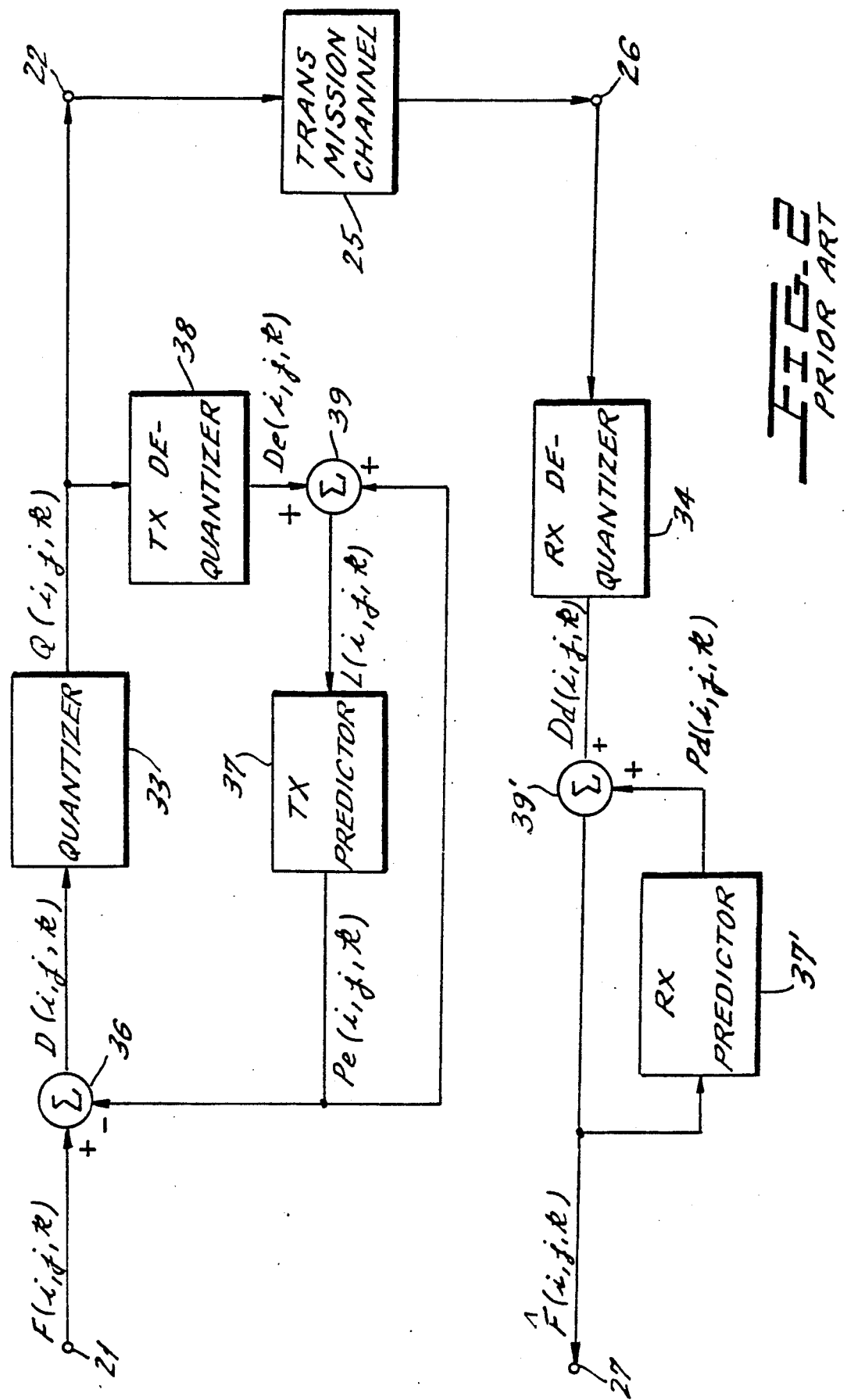
FIG. 2 is a block diagram illustrative of a conventional picture signal encoding device according to predictive encoding and a counterpart picture signal decoding device.

Referring to FIGS. 1 and 2, conventional picture signal encoding devices and counterpart picture signal decoding devices will be described at first in order to facilitate an understanding of the present invention. In FIGS. 1 and 2, the encoding devices are operable as transform and predictive encoding devices of the type discussed in the above-cited sections of the book written by William K. Pratt.

In FIG. 1, the transform encoding device has encoding device input and output terminals 21 and 22. An original picture signal is supplied to the device input terminal 21 as a digital signal. The original picture signal represents original pictures in succession. The encoding device supplies the device output terminal 22 with a device output signal which includes an encoded picture signal. The device output signal is transmitted to the decoding device through a transmission channel 25, which may be a memory file in the manner known in the art. The decoding device has decoding device input and output terminals 26 and 27. The device output signal is received at the decoding device input terminal 26 as a device input signal. The decoding device supplies the decoding device output terminal 27 with a reproduced picture signal representative of reproduced pictures which are reproductions of the respective original pictures.

It is convenient to understand that the original picture signal comprises signal portions or sections representative of the respective original pictures. Each signal portion consists of signal elements, each representative of a picture element of the original picture. The original picture signal will be represented by F(i, j, k), where i represents numbers assigned to the respective signal portions or original pictures as picture numbers. When attention is directed to one of the original pictures, F(i, j, k), will be said to represent an i-th original picture. A combination (j, k) represents picture element positions in the i-th original picture, where j represents ordinates and k, abscissae.

The original picture signal is delivered from the encoder device input terminal 21 to a forward transformer or transform carrying out circuit 31 which includes a dividing circuit (later illustrated) for dividing each signal portion into signal blocks representative of block areas which are contiguous to one another in each original picture. Each block is square in outline and consists of N×N picture elements, where N represents a predetermined natural number. The transformer 31 subjects each signal block to forward linear transform to produce a transform coefficient signal F(i, u, v) representative of transform coefficients, N×N in number for each signal block. It should be noted that F(i, j, k) and F(i, u, v) are different functions although the letter F is used as a function symbol in common.

The forward linear transform is defined by:

$$F(i, u, v) = \sum_{j=1}^{N} \sum_{k=1}^{N} F(i, j, k) AC(j, u) AR(k, v), \quad (1)$$

where F(i, u, v) now represents a square matrix of (N×N) transform coefficients, F(i, j, k) now represents a square matrix of (N×N) element signals, and AC(j, u) and AR(k, v) represent column and row matrixes. With reference to a selection threshold value, a coefficient selector 32 selects selected coefficients from the transform coefficients to produce a selected coefficient signal f(i, u, v). With reference to a quantization step size which defines a certain number of quantization levels, a quantizer 33 quantizes the selected coefficient signal into a quantization level number signal Q(i, u, v) representative of quantization level numbers assigned to the respective quantization levels. In the example being illustrated, the quantization level number signal is used as the device output signal.

In the illustrated example, the decoding device input terminal 26 receives the quantization level number signal as the device input signal. Using the quantization step size, a dequantizer 34 dequantizes the quantization level number signal into a dequantized signal in which the selected coefficients are recovered as dequantized coefficients. It will be presumed that the dequantizer 34 makes use of the selection threshold value in changing the dequantized coefficients to reproduced coefficients which are substantially identical with the respective transform coefficients. The dequantizer 34 thereby produces a reproduced coefficient signal F(i, u, v).

An inverse transformer 35 carries out inverse linear transform on the reproduced coefficient signal to produce the reproduced picture signal which will be denoted by F(i, j, k). The inverse linear transform is defined by:

$$F(i, j, k) = \sum_{u=1}^{N} \sum_{v=1}^{N} F(i, u, v) BC(j, u) BR(k, v), \quad (2)$$

where BC(j, u) and BR(k, v) represent inverse matrixes of the column and the row matrixeces.

In FIG. 2, similar parts are designated by like reference numerals. For example, a quantizer and a decoding device dequantizer are designated by the reference numerals 33 and 34 although these quantizer 33 and dequantizer 34 are for dealing with different input signals by using a quantization step size which is different from that used in FIG. 1.

Into a quantization level number signal Q(i, j, k) which is delivered to the encoding device output terminal 22 as the device output signal, the quantizer 33 quantizes a prediction error signal D(i, j, k) produced by a subtracter 36 which subtracts an encoding device predicted signal Pe(i, j, k) from the original picture signal F(i, j, k) supplied from the encoding device input terminal 21. In order to make an encoding device predictor 37 produce the predicted signal, an encoding device dequantizer 38 uses the quantization step size in dequantizing the quantization level number signal into an encoding device dequantized signal De(i, j, k) which is substantially identical with the prediction error signal. Calculating a sum of the dequantized signal and the predicted signal, an encoding device adder 39 produces a local decoded signal L(i, j, k) representative of the sum. Responsive to the local decoded signal, the predictor 37 produces the predicted signal.

The decoding device dequantizer 34 dequantizes the quantization level number signal supplied from the decoding device input terminal 26 as the device input signal. The dequantizer 34 thereby produces a decoding device dequantized signal D(i, j, k). A decoding device predictor 37' is for producing a decoding device predicted signal Pd(i, j, k). Calculating a sum of the decoding device dequantized and predicted signals, a decoding device adder 39' supplies the decoding device output terminal 27 and the decoding device predictor 37' with a decoded signal, which is the reproduced picture signal F(i, j, k).

In FIG. 1, the transform encoding device is given an information compression ratio by using the selected coefficients less in number than the transform coefficients and by using the quantization level number signal which has a less number of levels than the original picture signal. The information compression ratio is raised by suitable design of the coefficient selector 32. The selection threshold value should be determined so as to discard the transform coefficients which have small amplitudes, namely, which are of higher orders. For this purpose, variances have been calculated as regards the amplitudes of the transform coefficients statistically over a great number of original pictures to discard the transform coefficients having small variances in the manner described on page 673 of the above-mentioned book of Pratt. Such transform coefficients of small variances have been discarded as discarded coefficients equally over for all signal blocks. The transform coefficients may, however, have a large amplitude in a particular signal block for which the variances are small when calculated over the original pictures.

The conventional transform encoding device therefore has a defect such that the selected coefficients are not selected in compliance with local characteristics of the individual original pictures and that the reproduced pictures have an accordingly adversely affected picture quality. The defect would be removed if the selection threshold value were determined as regards each signal block of the original picture signal. It is, however, obvious that this results in another defect such that the device output signal must carry an increased amount of information.

In an improved transform encoding device revealed in the above-mentioned Chen et al article, the signal blocks are classified into four classes according to magnitudes of alternating-current energy of the signal blocks. Variances are thereafter calculated for the respective classes to determine four selection threshold values for the respective classes. This can reduce the otherwise increased amount of information. It should be noted here that use of the alternating-current energy magnitudes is based upon the rate distortion theory in the manner described on page 1288 of the Chen et al article. In fact, a rate distortion function is calculated according to Chen et al by using a mean square error as an encoding distortion. The mean square error is, however, not always suitable for use in defining the encoding distortion. An important fact is that the reproduced pictures are distortionless as far as possible when watched by human beings. In other words, the reproduced pictures should have a best possible picture quality when attention is directed to the human visual characteristics. The improved transform encoding device has a defect in that the human visual characteristics are not taken into consideration and that the reproduced pictures have an accordingly objectionable picture quality.

In FIG. 2, the predictive encoding device is given an information compression ratio by using the prediction error signal of a smaller amplitude than the original picture signal and by using the quantization level number signal which is less in number of levels than the original picture signal. The information compression ratio is raised by suitable design of the encoding device predictor 37. The amplitude of the prediction error signal is reduced by a predictor described on pages 650 to 657 of the book of Pratt. The predictor produces a predicted signal element in the predicted signal for a current signal element of the original picture signal by using a good number of locally decoded elements of the local decoded signal and by using an appropriate prediction formula.

Figure 3:
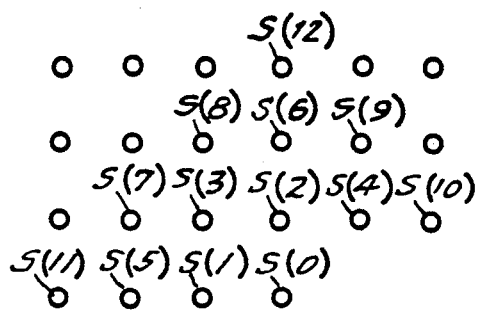
FIG. 3 schematically shows about two dozens of picture elements of an original picture.

Referring to FIG. 3, it will be surmised that the original picture signal represents at a certain time instant a current picture element S(0) of an original picture. In an array of the picture elements, a first picture element S(1) is leftwards next adjacent to the current picture element. A second picture element S(2) is upwardly next adjacent to the current picture element. A third picture element S(3) is leftwards next adjacent to the second picture element. A fourth picture element S(4) is rightwards next adjacent to the second picture element. Other picture elements are numbered as depicted. For use in predicting a current signal element S(0) (the same reference symbol being used) representative of the current picture element of the i-th original picture, the prediction formula may be:

$$S(0) = A0(i) + A1(i)S(1) + A2(i)S(2) + \ldots + A12S(12), \quad (3)$$

where S(0) represents the predicted signal element for the current signal element, S(1) through S(12) represent locally decoded elements for the picture elements S(1) to S(12) (the same reference symbols being used), A0(i) is a zeroth prediction coefficient, and A1(i) to A12(i) are herein called first through twelfth prediction coefficients which can be denoted generally by As(i) where s is variable from 1 to 12.

The fact should be noted in connection with the above that the locally decoded elements S(1) through S(12) of the local decoded signal are substantially similar to the signal elements which represent the picture elements S(1) to S(12) illustrated in FIG. 3, respectively, and which precede the current (signal) element S(0) in the original picture signal as preceding elements. A combination of the predictor 37 and the adder 39 therefore serves as a predicting circuit responsive to the preceding elements for producing a predicted signal predictive of the current element in compliance with a predetermined prediction formula defined by a plurality of prediction coefficients for the respective preceding elements.

In a conventional predictive encoding device, the prediction coefficients have been determined in consideration of a statistical characteristic of the original pictures so as to reduce an average amplitude of the prediction error signal. For example, the first prediction coefficient is given a large value when the pictures have a statistically high horizontal correlation. The second prediction coefficient has a large value when the pictures have a statistically high vertical correlation. The third prediction coefficient has a large value when the pictures have a statistically high correlation diagonally from leftwards top to rightwards bottom. The fourth prediction coefficient has a large value when the pictures have a statistically high correlation diagonally from leftwards bottom to rightwards top.

When each original picture is locally examined, the correlation may be different from that determined statistically over a multitude of original pictures. The conventional predective encoding device therefore has a defect such that the prediction coefficients are not determined in conformity with local characteristics of the individual original pictures and that the reproduced pictures have an accordingly inferior picture quality. The defect would be removed if the prediction coefficients were determined dependent on local characteristics of the individual original pictures. This, however, results in another defect such that the device output signal must carry an increased amount of information.

Figure 4:
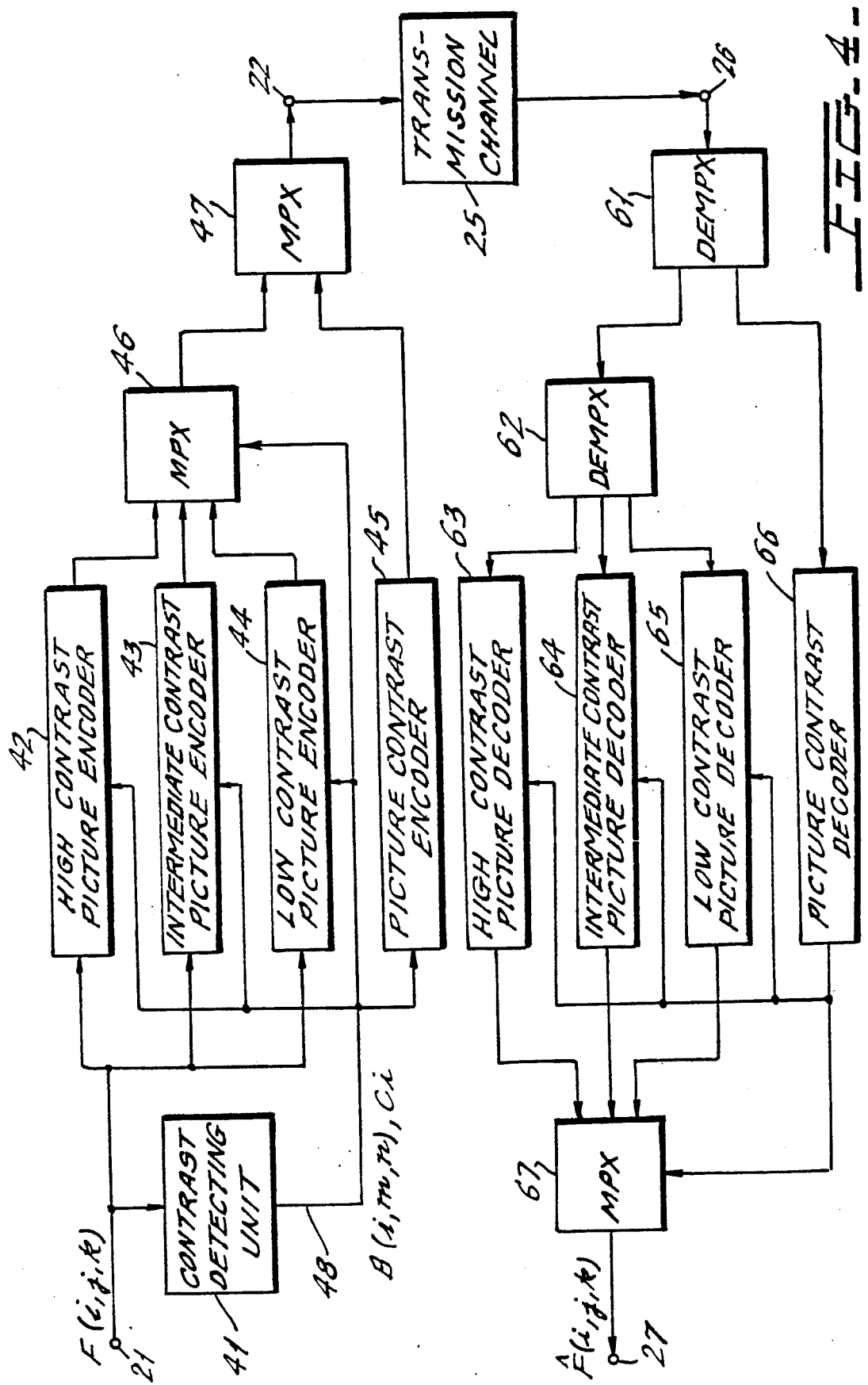
FIG. 4 is a block diagram which shows a picture signal encoding device according to a first general embodiment of the instant invention and a counterpart picture signal decoding device.

Referring now to FIG. 4, the description will proceed to a picture signal encoding device according to a first general embodiment of the present invention. In the manner described above in conjunction with FIGS. 1 and 2, the encoding device has encoding device input and output terminals 21 and 22. An original picture signal $F(i, j, k)$ is supplied to the device input terminal 21 as a digital signal. A device output signal is delivered from the device output terminal 22 to a transmission channel 25 which may be a memory file. A counterpart picture signal decoding device has decoding device input and output terminals 26 and 27. The device output signal is received at the decoding device input terminal 26 as a device input signal. A reproduced picture signal $F(i, j, k)$ is delivered to the decoding device output terminal 27.

In the encoding device, the original picture signal is delivered from the encoding device input terminal 21 to a block or inter-block contrast detecting unit 41, a high contrast picture encoder 42, an intermediate contrast picture encoder 43, and a low contrast picture encoder 44. As will presently be described, the contrast detecting unit 41 delivers a region identification signal $B(i, m, n)$ and a block or inter-block contrast stage signal $Ci$ to the high through the low contrast picture encoders 42 to 44, a picture contrast encoder 45, and a first multiplexer 46.

In the manner which will become clear as the description proceeds, the high through the low contrast picture encoders 42 to 44 are for encoding the original picture signal under the control of the region identification signal and the block contrast stage signal into a high contrast-encoded picture signal, an intermediate contrast encoded picture signal, and a low contrast encoded picture signal. Controlled by the region identification signal and the block contrast stage signal, the first multiplexer 46 selects one of the high through the low contrast encoded picture signal at a time. The first multiplexer 46 thereby produces an encoded picture signal into which the original picture signal is encoded.

The picture contrast encoder 45, as herein called, subjects the region identification signal and the block contrast stage signal to variable length encoding to produce an encoded region signal and an encoded contrast signal, which may be termed collectively an encoded region and contrast signal and is a variable length code signal, such as a Huffman code signal or a run length code signal. For each signal portion or section, a second multiplexer 47 selects the encoded region and contrast signal at first and subsequently the encoded picture signal. The second multiplexer 47 thereby delivers the device output signal to the encoding device output terminal 22. Incidentally, the block contrast detecting unit 41 delivers the region identification signal and the block contrast stage signal to the high through the low contrast picture encoders 42 to 44 and the picture contrast encoder 45 through a supply lead 48.

Figure 5:
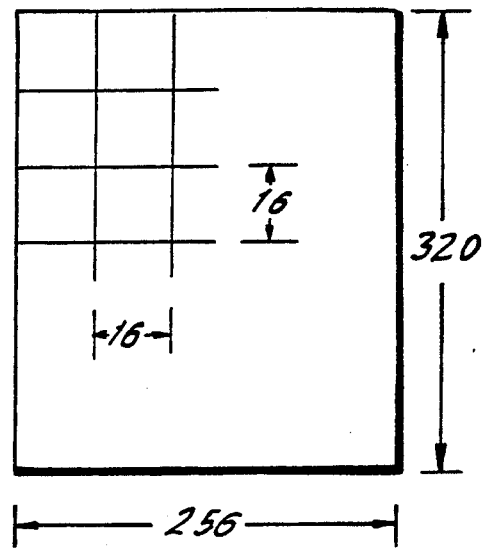
FIG. 5, drawn on the right-hand side of FIG. 3 merely for convenience of illustration, shows an original picture in outline and block areas.

Turning to FIG. 5 during a short while, it will be assumed that each original picture is divisible into picture elements, 320 and 256 in number vertically and horizontally. In the manner which will shortly be described, the original picture is divided into a plurality of block areas, each consisting of 16×16 picture elements. In other words, the number of sixteen is used as the predetermined natural number N mentioned heretobefore. In the example being illustrated, the original picture is divided into 320 block areas. It is known in the art of transform encoding that each original picture need not consist of the picture elements of a number which is either vertically or horizontally an integral multiple of the predetermined natural number.

Figure 6:
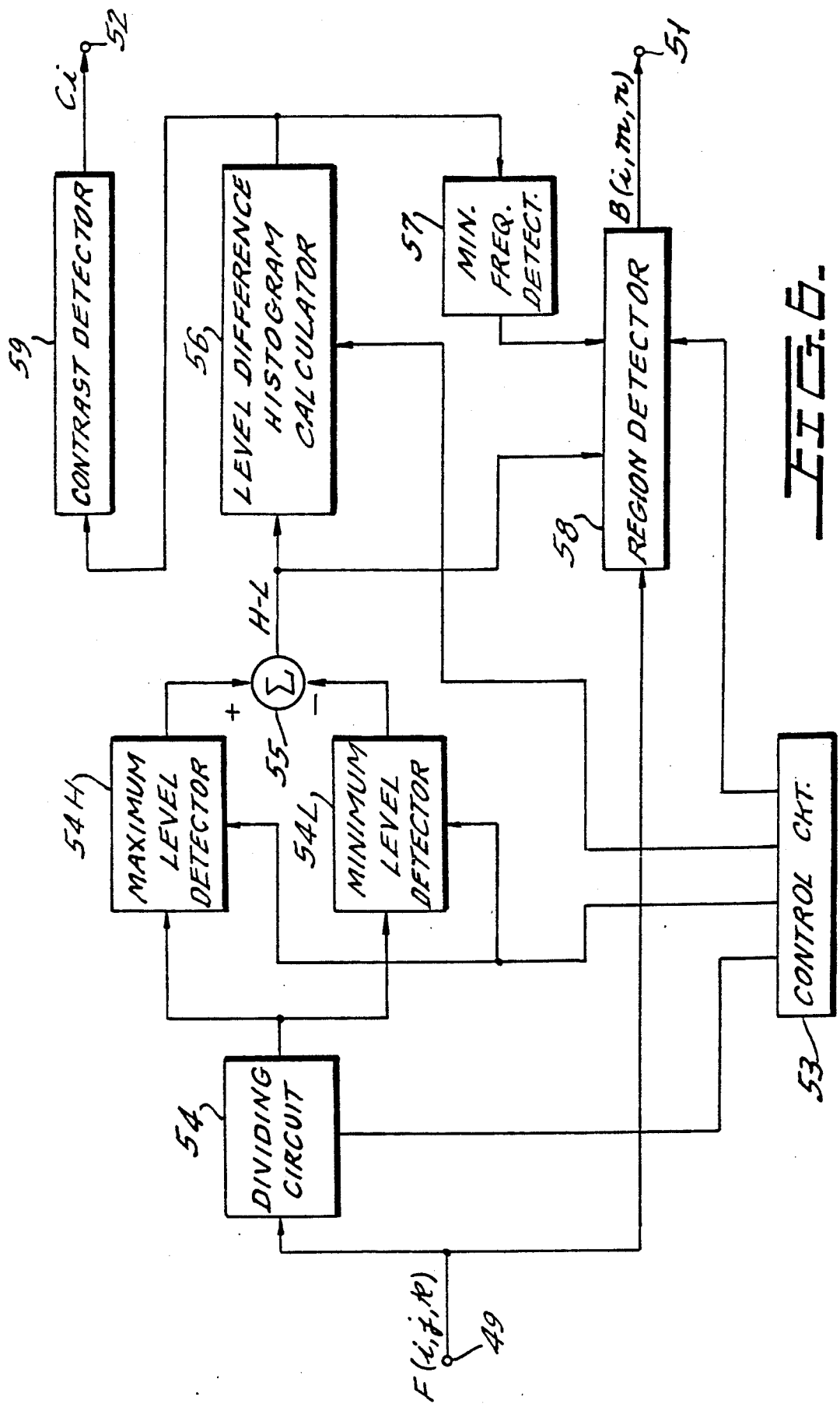
FIG. 6 is a block diagram of a block contrast detecting unit for use in the encoding device illustrated in FIG. 4.

Referring to FIG. 6, the block or inter-block contrast detecting unit 41 has a unit input terminal 49 supplied with the original picture signal from the encoding device input terminal 21. Through first and second output terminals 51 and 52, the region identification signal and the block contrast stage signal are delivered to the supply lead 48. A control circuit 53 is for generating a clock signal and a synchronization signal.

Controlled by the clock and the synchronization signals in the manner known in the art, a dividing circuit 54 divides each signal portion or section of the original picture signal into signal blocks which represent the respective block areas in each original picture in the manner exemplified in FIG. 5. More in general, the block areas are contiguous to one another in each original picture and have a common size.

A maximum level detector 54H is for detecting a maximum level H in each signal block to produce a maximum level signal. A minimum level detector 54L is for detecting a minimum level L in the signal block under consideration to produce a minimum level signal. Calculating a difference (H−L) between the maximum and the minimum levels, a subtracter 55 produces a level difference signal.

Controlled by the clock and the synchronization signals and supplied with the level difference signal, a level difference histogram calculator 56 produces a level difference histogram signal representative of a frequency distribution of the level differences in each signal portion. Stated otherwise, the frequency distribution represents the number of block areas in each original picture versus the level difference.

Turning temporarily to FIG. 7, it will be presumed for a signal portion representative of a certain original picture that the level difference frequency distribution is obtained in the manner exemplified by a curve in the figure. The curve will be referred to as a level difference frequency distribution curve. The frequency distribution has a minimum frequency at a particular level difference D. This shows that the signal blocks of the signal portion have level differences which are smaller and greater than the particular level difference. It is possible to understand that the block areas are in a background region and a picture or non-background region when the signal blocks have the smaller and the greater level differences. Depending on the original picture, such a minimum frequency may not be clear from the level difference frequency distribution. It is nevertheless possible to define the background and the picture regions by defining such a level difference as a predetermined level difference. As a numerical example, an original picture signal has one of sixteen levels from time to time. In this numerical example, the predetermined difference is preferably set at a difference of six levels. It should moreover be noted that each original picture need not always have a background region.

Turning back to FIG. 6, a minimum frequency detector 57 is supplied with the level difference histogram signal to detect the minimum frequency and the predetermined level difference D. Responsive to the predetermined level difference, a region detector 58 classifies the level differences into a background difference and a picture or non-background difference. Supplied with the original picture signal and the clock and the synchronization signals, the region detector 58 supplies the first output terminal 51 with the region identification signal B(i, m, n) which represents whether the respective block areas of each original picture are in the background region or in the picture region. It is now understood that a combination (m, n) represents block area positions in each original picture.

The region identification signal has one of two values for each signal block and consequently for each block area. For example, the block areas of the background region are indicated by a value 1. The block areas of the picture region are indicated by another value 0.

Referring to FIG. 8 in addition to FIG. 6, the level difference frequency distribution curve is illustrated now by a solid-line curve and a dashed-line curve for the level differences of the picture and the background regions. For a block contrast detector 59, first and second level differences D1 and D2 are predetermined above the predetermined level difference D. In the numerical example described in connection with FIG. 7, eight and ten levels are preferred as the first and the second level differences. Supplied with the level difference histogram signal, the contrast detector 59 calculates a total frequency covered by the solid-line curve, a first frequency sum of the frequencies of occurrence of the level differences between the predetermined level difference D and the first level difference D1, and a second frequency sum of the frequencies of occurrence of the level differences above the second level difference D2. Subsequently, the contrast detector 59 calculates a first ratio of the first frequency sum to the total frequency and a second ratio which the second frequency sum has relative to the total frequency.

First and second high and low ratios, four in total, are predetermined for the contrast detector 59. For the numerical example described above, these ratios may be 25°/o, 50°/o, 25°/o, and 5°/o. When the first ratio is above the first high ratio and furthermore when the second ratio is above the second high ratio, the original picture under consideration is judged to have a high contrast among the block areas. When the first ratio is below the first low ratio and moreover the second ratio is below the second low ratio, the original picture in question is said to have a low contrast among the block areas. Otherwise, the original picture is judged to have an intermediate contrast among the block areas.

In FIG. 6, a major portion of the block contrast detecting unit 41 is used as a block or inter-block contrast detecting circuit. In the contrast detecting circuit, the maximum and the minimum level detectors 54H and 54L and the subtracter 55 serve collectively as a level difference detecting circuit responsive to the signal blocks of each signal portion for detecting a level difference between a maximum and a minimum level in each signal block. The level difference is variable from one of the signal blocks to another of the signal blocks. The histogram calculator 56 and the block contrast detector 59 collectively serve as a block contrast detecting circuit coupled to the level difference detecting circuit for detecting a measure of contrast in compliance with the level differences detected in each signal portion.

The measure of contrast represents contrast among the block areas of each original picture and is variable from a picture to another in a predetermined number of stages, such as three stages of a high, an intermediate, and a low stage of contrast. The contrast detecting circuit thereby supplies the second output terminal 52 with the block contrast stage signal Ci indicative of the stages of contrast for the respective original pictures. The contrast stage signal indicates, for example, values 0, 1, and 2 when the contrast is high, intermediate, and low.

A certain level difference, such as the first level difference D1, may be referred to as a preselected level difference depending on the circumstances. The preselected (level) difference should be greater than the predetermined (level) difference D. When the level difference is smaller than the preselected difference, it is possible to refer to the contrast as a low contrast.

In FIG. 6, a part of the block contrast detecting unit 41 serves as a region identifying circuit. More particularly, the region identifying circuit comprises the background detector 58 as its principal component and is coupled to the level difference detecting circuit to identify the background region and the picture or non-background region in each original picture with reference to the level differences detected in each signal portion. It should be noted that the picture region consits usually of a plurality of block areas and that an original picture of a high contrast may or may not include the background region. Even an original picture of the low contrast may or may not include the background region. If included, the back ground region consists of at least one block area.

Referring more particularly to FIG. 4, the high contrast picture encoder 42 encodes the original picture signal when the contrast stage signal indicates the high contrast stage. Encoding is carried out on the signal blocks in the picture region of the original picture for which the contrast stage signal indicates the high contrast. In this manner, the low contrast picture encoder 44 encodes the original picture signal either when the contrast stage signal indicates the low contrast or when the region identification signal indicates the background region. The first multiplexer 46 selects the high through the low contrast encoded picture signals when the contrast stage signal indicates the high contrast, when the contrast stage signal indicates the intermediate contrast, and either when the contrast stage signal indicates the low contrast or when the region identification signal indicates the background region.

A combination of the high through the low contrast picture encoders 42 to 44 and the first multiplexer 46 serves as a picture encoder. The original picture signal is delivered to the picture encoder directly as it stands. It should, however, be understood that the picture encoder encodes, in practice, the signal blocks into the encoded picture signal because the picture encoder is controlled by the region identification signal which indicates the background and the picture regions for the respective signal blocks of the original picture signal in the manner pointed out above.

In FIG. 4, the picture signal decoding device comprises a first demultiplexer 61 for demultiplexing the device input signal into a demultiplexed or decomposed picture signal and a demultiplexed or decomposed region and contrast signal. A second demultiplexer 62 is operable like the first multiplexer 46 and demultiplexes the demultiplexed picture signal into a demultiplexed high contrast picture signal, a demultiplexed intermediate contrast picture signal, and a demultiplexed low contrast picture signal. The demultiplexed high through the low contrast picture signals are delivered to a high contrast picture decoder 63, an intermediate contrast picture decoder 64, and a low contrast picture decoder 65. The demultiplexed region and contrast signal is delivered to a picture contrast decoder 66 operable in conformity with the picture contrast encoder 45 to supply an output multiplexer 67 and the high through the low contrast picture decoders 63 to 65 with a decoded region signal and a decoded contrast signal which are reproductions of the region identification signal and the contrast stage signal unless the device output signal is incorrectly or erroneously received at the decoding device input terminal 26 as the device input signal.

The high through the low contrast picture decoders 63 to 65 correspond to the high through the low contrast picture encoders 42 to 44. For example, the high contrast picture decoder 63 decodes the demultiplexed high contrast picture signal into a reproduced high contrast picture signal when the decoded contrast signal indicates the high contrast. The low contrast picture decoder 65 decodes the demultiplexed low contrast picture signal into a reproduced low contrast picture signal either when the decoded contrast signal indicates the low contrast or when the decoded region signal indicates the background region. Controlled by the decoded region and contrast signals, the output multiplexer 67 selects the reproduced high through low contrast picture signals when the decoded contrast signal indicates the high contrast, when the decoded contrast signal indicates the intermediate contrast, and either when the decoded contrast signal indicates the low contrast or when the decoded region signal indicates the background region. The output multiplexer 67 thereby delivers the reproduced picture signal to the decoding device output terminal 27.

Figure 9:
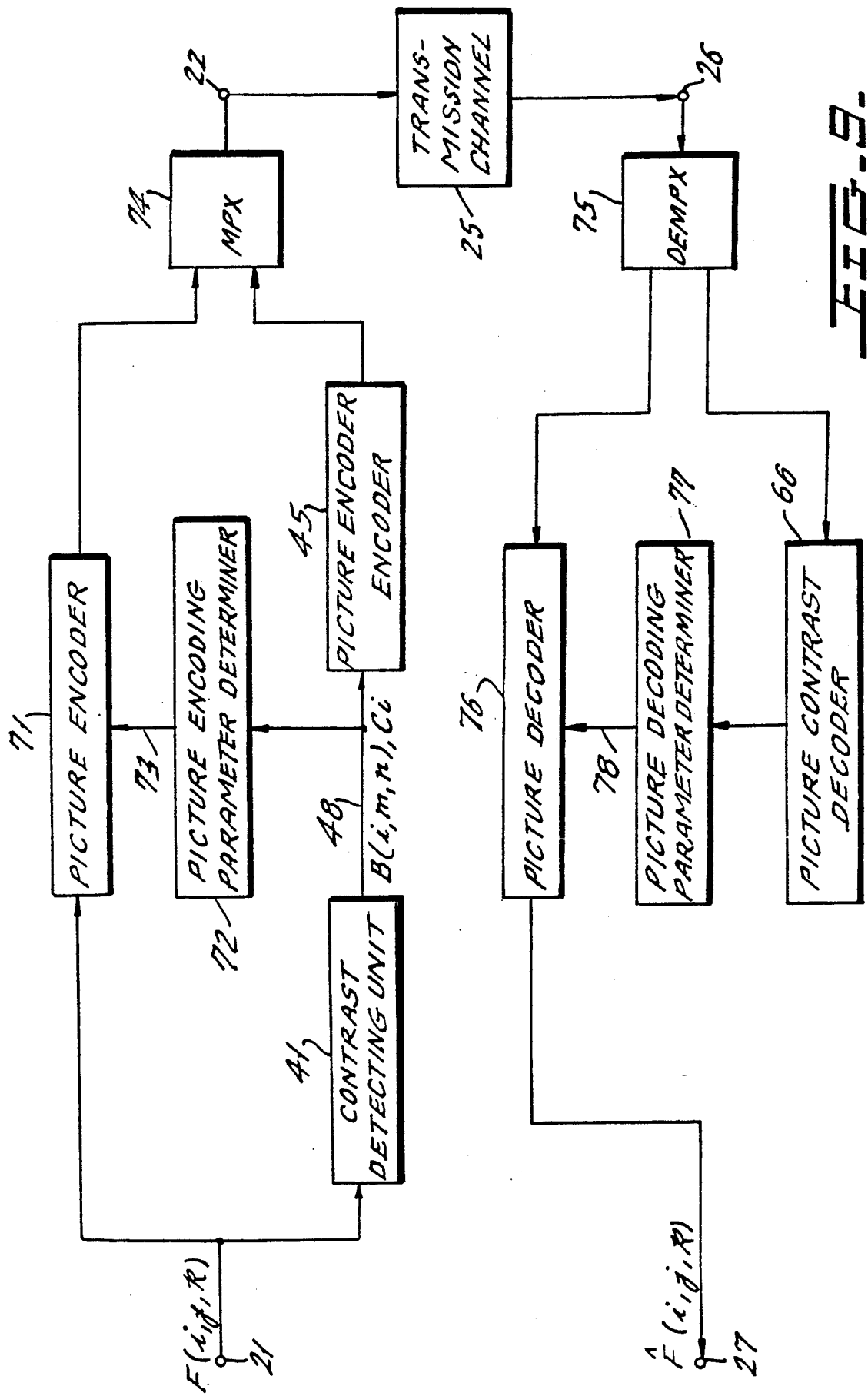
FIG. 9 is a block diagram which shows a picture signal encoding device according to a second general embodiment of this invention and a counterpart picture signal decoding device.

Referring now to FIG. 9, the description will proceed to a picture signal encoding device according to a second general embodiment of this invention and to a counterpart picture signal decoding device. In the manner described above in connection with FIG. 4, the encoding device has encoding device input and output terminals 21 and 22. An original picture signal F(i, j, k) is supplied to the device input terminal 21. A device output signal is delivered to a transmission channel 25 from the device output terminal 22. The decoding device has decoding device input and output terminals 26 and 27. The device output signal is received at the decoding device input terminal 26 as a device input signal. A reproduced picture signal F(i, j, k) is delivered to the decoding device output terminal 27.

In the encoding device, the original picture signal is delivered to a block or inter-block contrast detecting circuit 41 which is identical with that described in connection with FIGS. 5 through 8 and supplies a picture contrast encoder 45 through a supply lead 48 with a region identification signal B(i, m, n) and a block contrast stage signal Ci. The original picture signal is delivered furthermore to a picture encoder 71. The region identification and the contrast stage signals are supplied to a picture encoding parameter determiner 72.

In the manner which will later be described in detail, the picture encoder 71 is for encoding the original picture signal into an encoded picture signal in accordance with a predetermined encoding characteristic. The parameter determiner 72 is for supplying the picture encoder 71 through a supply connection 73 with an encoding parameter signal representative of picture encoding parameters which define the encoding characteristic. In practice, the picture encoder 71 is operable as a transform encoder or a predictive encoder and includes a quantizer. For the quantizer, the parameter signal specifies the quantization step size as one of the encoding parameters. For the transform encoder, the parameter signal moreover specifies the selection threshold value mentioned before in connection with FIG. 1. For the predictive encoder operable in compliance with a predetermined prediction formula exemplified by Equation (3), the parameter signal specifies the prediction coefficients collectively as one of the encoding parameters.

In the encoding device, the picture contrast encoder 45 encodes the region identification and the block contrast stage signals into an encoded region and contrast signal of the type described above in conjunction with FIG. 4. A multiplexer 74 selects at first the encoded region and contrast signals produced for each signal portion of the original picture signal and then the encoded picture signal which is produced for the signal block of the signal portion under consideration. The multiplexer 74 thereby delivers the device output signal to the encoding device output terminal 22.

In order to compare FIG. 4 with FIG. 9 for a short while, it will be surmised that the region identification signal indicates one of a background and a picture or non-background region for each signal block and that the contrast stage signal indicates one of a high, an intermediate, and a low contrast stage for each signal portion. In this event, a combination of the high through the low contrast picture encoders 42 to 44 of the first multiplexer 46 corresponds to a combination of the picture encoder 71, the encoding parameter determiner 72, and the supply connection 73.

Referring again to FIG. 9, a demultiplexer 75 demultiplexes the device input signal into a demultiplexed or decomposed picture signal and a demultiplexed or decomposed region and contrast signal. This demultiplexer 75 corresponds to the first demultiplexer 61 described in conjunction with FIG. 4. Like in FIG. 4, a picture contrast decoder 66 decodes the demultiplexed region and contrast signal into a decoded region signal and a decoded contrast signal which are reproductions of the region identification and the contrast stage signals used in the encoding device.

For delivery to the decoding device output terminal 27, a picture decoder 76 decodes the demultiplexed picture signal into the reproduced picture signal in compliance with a predetermined decoding characteristic. Responsive to the decoded region and contrast signals, a picture decoding parameter determiner 77 supplies the picture decoder 76 through a supply connection 78 with a decoding parameter signal representative of picture decoding parameters which define the decoding characteristic and correspond to the respective picture encoding parameters used in the encoding device.

Figure 10:
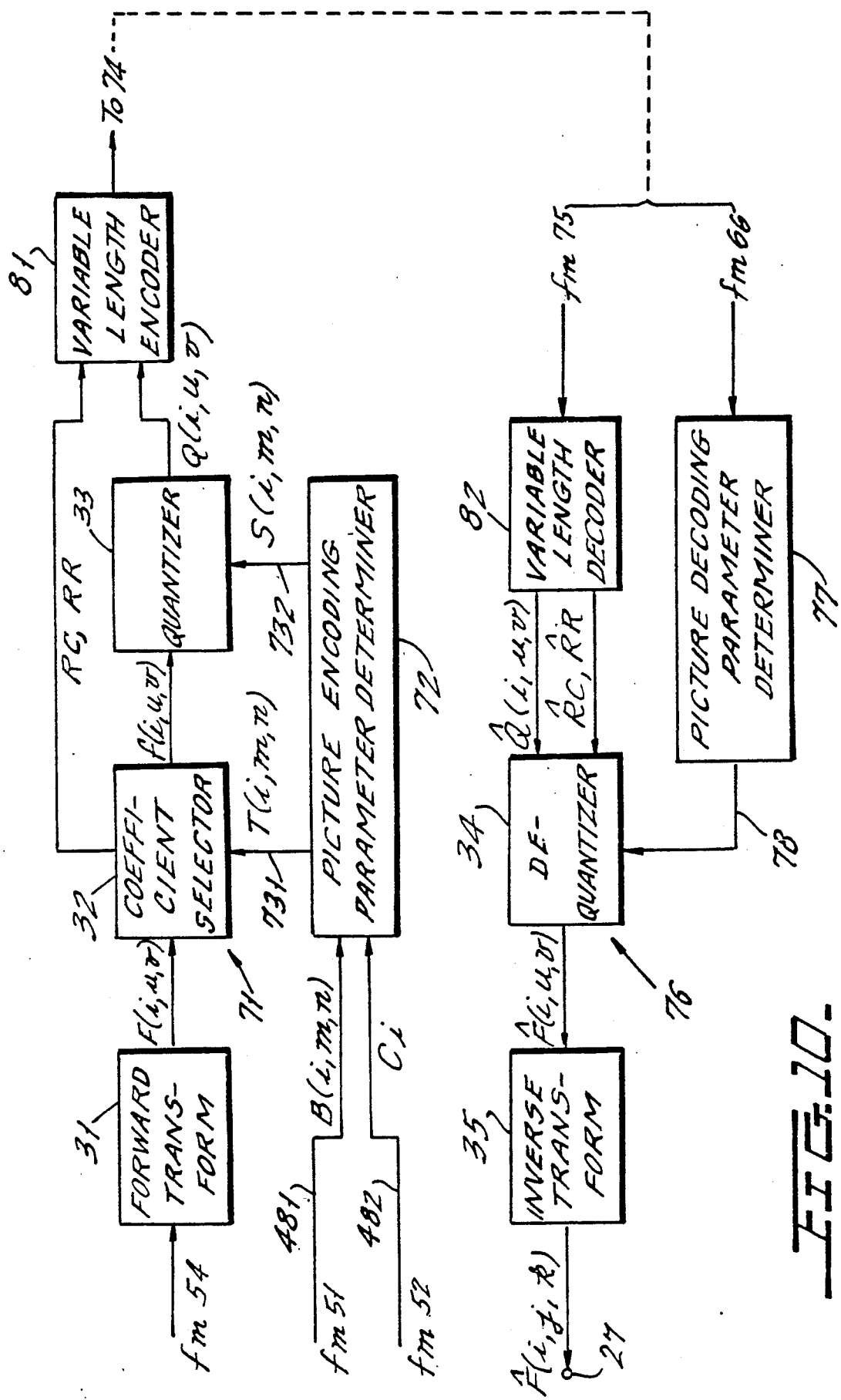
FIG. 10 is a block diagram of portions of a picture signal encoding device according to a first practical embodiment of this invention and of a counterpart picture signal decoding device.

Referring to FIG. 10, attention will be directed to a picture signal encoding device according to a first practical embodiment of this invention and to a counterpart picture signal decoding device. A decoding device output terminal 27 is depicted. In the manner described in conjunction with FIG. 9, the encoding and the decoding devices comprise a picture encoder 71, a picture encoding parameter determiner 72, a picture decoder 76, and a picture decoding parameter determiner 77. Being not different from those described in connection with FIG. 9, a block contrast detecting unit 41, a picture contrast encoder 45, and a picture contrast decoder 66 are not depicted. Instead, the supply lead 48 is depicted separately as first and second leads 481 and 482 which are connected to the first and the second output terminals 51 and 52 described with reference to FIG. 6.

Like in FIG. 1, the picture encoder 71 comprises a forward transformer 31, a coefficient selector 32, and a quantizer 33. It will now be assumed that the transformer 31 is supplied successively with the signal blocks of the original picture signal from the diving circuit 54 of the type described with reference to FIG. 6 and produces transform coefficients F(i, u, v) according to Equation (1). Supplied with the region identification signal B(i, m, n) and the contrast stage signal Ci through the first and the second leads 481 and 482, the encoding parameter determiner 72 supplies the coefficient selector 32 through a first connection 731 with a selection threshold signal which indicates selection threshold values T(i, m, n) for the respective signal blocks as a part of the encoding parameters. The encoding parameter determiner 72 furthermore supplies the quantizer 33 through a second connection 732 with a quantization step size signal which indicates quantization step sizes Z(i, m, n) for the respective signal blocks as another part of the encoding parameters.

Responsive to the selection threshold signal, the coefficient selector 32 selects the selected coefficients f(i, u, v) from the transform coefficients, discarding other transform coefficients as discarded coefficients. In the manner known in the art, a value of zero is given in common to the discarded coefficients. Responsive to the quantization step signal, the quantizer 33 quantizes the selected coefficient signal into the quantization level number signal Q(i, u, v). The coefficient selector 32 furthermore produces, in response to the selection threshold signal, a range signal indicative of vertical or column-wise range RC and a horizontal or row-wise range RR collectively as a selection range for each signal block. A variable length encoder 81 serves as a level number signal encoder in subjecting the quantization level number signal and the range signal to variable length encoding to supply the multiplexer 74 with a variable length code signal, such as the Huffman code signal. A combination of the quantizer 33 and the level number signal encoder 81 serves as a coefficient encoder which encodes the selected coefficients into the encoded picture signal.

Figure 11:
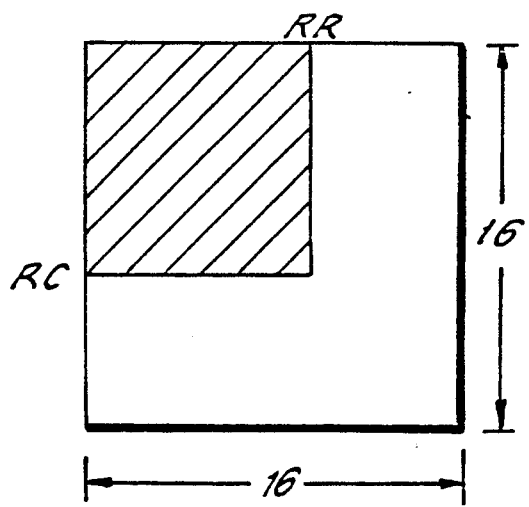
FIG. 11, drawn below
Figure 12:
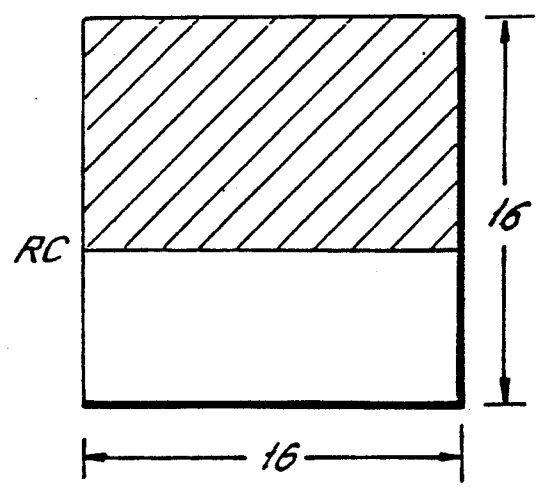
FIG. 12 again shows the matrix depicted in FIG. 11.

Turning temporarily to FIGS. 11 and 12, the transform coefficients are depicted for a certain one of the signal blocks in a matrix form as 16-row 16-column matrix according to orders of the respective transform coefficients vertically downwards and horizontally rightwards from low-order ones to high-order ones. In FIG. 11, the selected coefficients are shown by a hatched area. The vertical range is determined, for example, at first according to:

$$\sum_{u=RC+1}^{16}\sum_{v=1}^{16}[f(i, u, v)]^2 \leq T(i, m, n) < \sum_{u=RC}^{16}\sum_{v=1}^{16}[f(i, u, v)]^2,$$

so as to indicate the vertical range hatched in FIG. 12. In this event, the horizontal range is next determined according to:

$$\sum_{u=1}^{16}\sum_{v=RR+1}^{16}[f(i, u, v)]^2 \leq T(i, m, n) < \sum_{u=1}^{16}\sum_{v=RR}^{16}[f(i, u, v)]^2,$$

so as to select the selected coefficients in the vertical range hatched in FIG. 12.

Turning back to FIG. 10, the picture decoder 76 comprises a dequantizer 34 and an inverse transformer 35, each of the type described in conjunction with FIG. 1. Supplied from the demultiplexer 75 with the demultiplexed picture signal which includes a variable length code signal representative of the vertical and the horizontal ranges, a variable length decoder 82 carries out variable length decoding to produce a reproduction Q(i, u, v) of the quantization level number signal and a reproduction of the range signal which indicates reproductions RC and RR of the vertical and the horizontal ranges. The dequantizer 34 dequantizes the quantization level number signal into reproductions of the selected coefficients. Adding the value of zero to the reproductions of the selected coefficients with reference to the reproductions of the vertical and the horizontal ranges, the dequantizer 34 produces reproductions F(i, u, v) of the transform coefficients. The inverse transformer 35 produces the reproduced picture signal F(i, j, k) in accordance with Equation (2).

Figure 13:
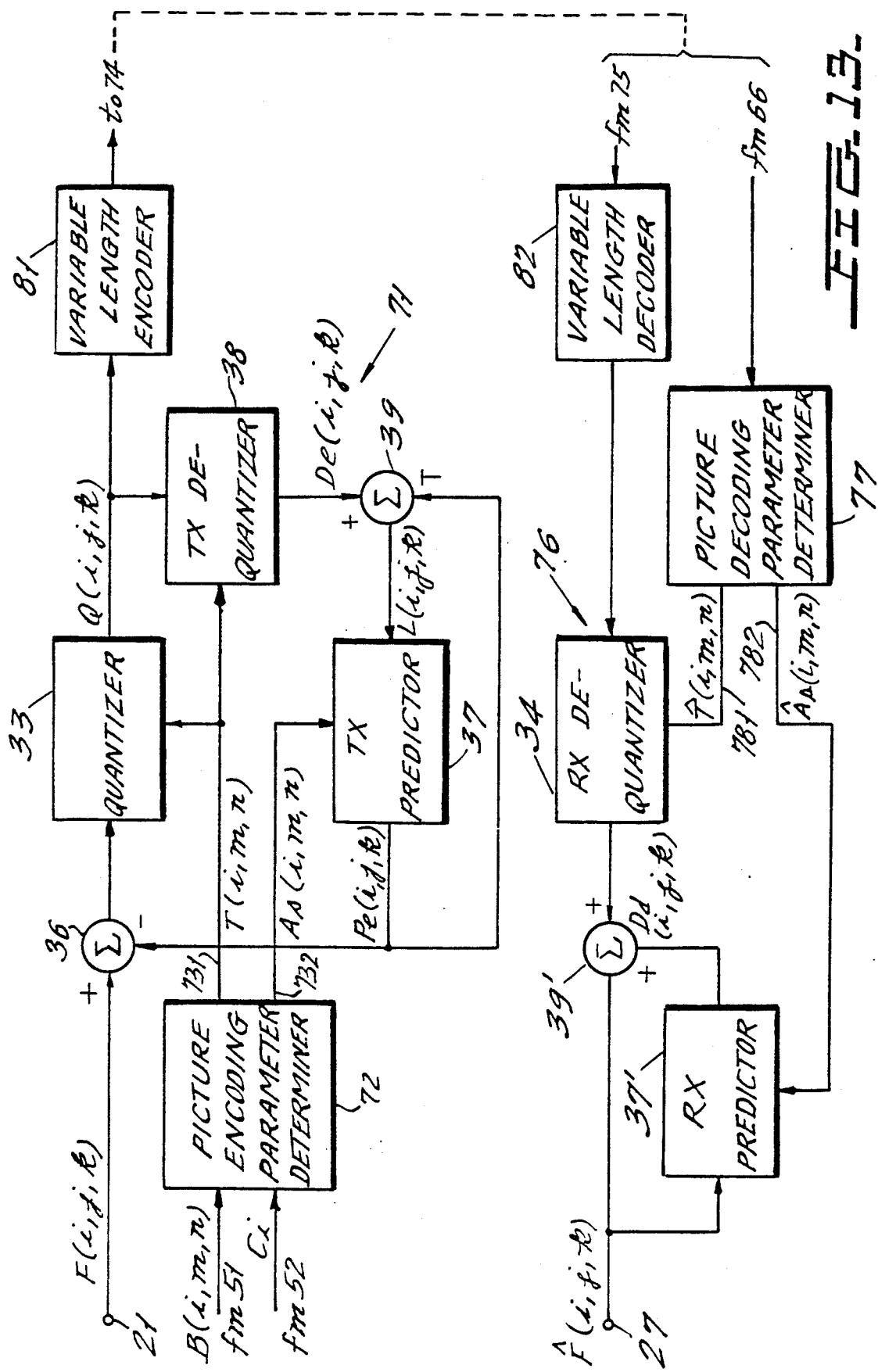
FIG. 13 is a block diagram of portions of a picture signal encoding device according to a second practical embodiment of this invention and of a counterpart picture signal decoding device.

Referring to FIG. 13, attention will be directed to a picture signal encoding device according to a second practical embodiment of this invention and to a counterpart picture signal decoding device. An encoding device input terminal and a decoding device output terminal are depicted at 21 and 27. Like in FIG. 9, the encoding and the decoding devices comprise a picture encoder 71, a picture encoding parameter determiner 72, a picture decoder 76, and a picture decoding parameter determiner 77. Instead of the block contrast detector 41, the first and the second leads 481 and 482 are illustrated.

Like in FIGS. 2 and 9, the picture encoder 71 comprises a quantizer 33, a subtracter 36, an encoding device predictor 37, an encoding device dequantizer 38, an encoding device adder 39, and a variable length encoder 81. The picture decoder 76 comprises a decoding device dequantizer 34, a decoding device predictor 37', a decoding device adder 39', and a variable length decoder 82. Like in FIG. 10, the variable length encoder 81 serves as a level number signal encoder. A combination of the quantizer 33 and the level number signal encoder 81 serves as a signal encoder for encoding the predicted signal into the encoded picture signal.

Responsive to the region identification and the contrast stage signals, the picture encoding parameter determiner 72 produces a quantization step signal indicative of quantization step sizes Z(i, m, n) for the respective signal blocks as a part of the encoding parameters. Moreover, the encoding parameter determiner 72 produces a prediction coefficient signal indicative of prediction coefficients As(i, m, n) for the respective signal blocks as another part of the encoding parameters. The prediction coefficients are for use as the prediction coefficients As(i) in Equation (3) in calculating the predicted signal element S(0) for each picture element in each signal block. The zeroth coefficient A0(i, m, n) is equal to zero. The picture decoding parameter determiner 72 produces a quantization step signal and a prediction coefficient signal which are reproductions of those produced by the picture encoding parameter determiner 72.

In contrast to the encoding device illustrated with reference to FIG. 2, the quantizer 33 and the encoding device dequantizer 38 are controlled by the quantization step signal produced by the picture encoding parameter determiner 72. The encoding device predictor 37 is controlled by the prediction coefficient signal produced by the encoding parameter determiner 72. The decoding device dequantizer 34 and the decoding device predictor 37' are controlled by the quantization step signal and the prediction coefficient signal produced by the picture decoding parameter determiner 77.

For the picture signal encoding devices illustrated with reference to FIGS. 9 and 13 and consequently for the counterpart picture signal decoding devices, the above-named predetermined difference D of the level differences in the respective signal blocks will now be referred to afresh as a preselected difference. A predetermined difference will be selected afresh for the level difference in the respective signal blocks either at the first difference D1 or between the first and the second differences D1 and D2.

It is preferred to give a smallest value to the quantization step size for use in dealing with the selected coefficient signal, the prediction error signal, and the reproduction of quantization level number signal which are produced in response to each signal block having a level difference of the background difference. A relatively small value is given to the quantization step size which should be used in dealing with the above-referenced signals produced in response to each signal block of the signal portion representative of an original picture of the low contrast. A relatively great value is given to the quantization step size which should be used in processing the signals produced in response to each signal block of the signal portion representative of an original picture of the intermediate contrast. A greatest value is given to the quantization step size which should be used in processing the signals produced in response to each signal block of the signal portion representative of an original picture of the high contrast. It is now appreciated in general that the quantization step sizes comprise a smallest, a smaller, and a greater step size when the level difference is the background difference and is lower and higher than the predetermined difference, respectively.

It should be noted in connection with the quantization step sizes that the encoding distortion is readily visible by human beings when the contrast is low. Typically, the encoding distortion is block distortion when the encoding and the decoding devices are of the type illustrated with reference to FIG. 10. The encoding distortion is granular noise when the encoding and the decoding devices are of the type illustrated with reference to FIG. 13. The smallest step size is therefore used for the block areas which are in the background region and have a very low contrast stage. This makes it possible to render the encoding distortion difficult to perceive and to give the reproduced pictures an excellent picture quality.

For the picture signal encoding and decoding devices illustrated with reference to FIG. 10, a greatest value is given to the selection threshold value which should be used in selecting the selected coefficients from the transform coefficients produced in response to each signal block having a level difference of the background difference. A relatively great value is given to the selection threshold value for use in connection with each signal block of the signal portion representative of an original picture of the low contrast. A relatively great value is given to the selection threshold value for use in connection with each signal block of the signal portion representative of an original picture of the intermediate contrast. A greatest value is given to the selection threshold value which should be used in connection with each signal block of the signal portion representative of an original picture of the high contrast. The selection threshold values therefore comprise a greatest, a greater, and a smaller threshold value when the level difference is the background difference and is higher and lower than the predetermined difference, respectively.

It should be noted in connection with the selection threshold values that a smaller threshold value is used for each block area of a low contrast picture so as to discard a small number of the transform coefficients as the discarded coefficients. On the other hand, the background region has a very low contrast stage. When included in the background region, a plurality of block areas have a substantially common brightness. The greatest threshold value is used for each block area of the background region to make the selected coefficients represent an average brightness of the block areas of the background region. This makes it possible to render the block distortion and the like encoding distortion difficult to perceive and to give the reproduced pictures an excellent picture quality.

For the picture signal encoding and decoding devices illustrated with reference to FIG. 13, it is preferred that the first through the twelfth prediction coefficients should be determined according to Table 1 given in three parts (a) through (c). The prediction coefficients are for use in connection with the respective preceding elements S(1) through S(12) of each signal block in Equation (3) as their respective coefficients.

TABLE 1 (a)

| Ci | B(i, m, n) | A1(i, m, n) | A2(i, m, n) | A3(i, m, n) | A4(i, m, n) |
|---|---|---|---|---|---|
| 0 | 0 | 1/6 | 1/6 | 1/6 | 1/6 |
|   | 1 | 1/12 | 1/12 | 1/12 | 1/12 |
| 1 | 0 | ⅛ | ⅛ | ⅛ | ⅛ |
|   | 1 | 1/12 | 1/12 | 1/12 | 1/12 |
| 2 | 0 | ⅛ | ⅛ | ⅛ | ⅛ |
|   | 1 | 1/12 | 1/12 | 1/12 | 1/12 |

TABLE 1 (b)

| Ci | B(i, m, n) | A5(i, m, n) | A6(i, m, n) | A7(i, m, n) | A8(i, m, n) |
|---|---|---|---|---|---|
| 0 | 0 | 1/6 | 1/6 | 0 | 0 |
|   | 1 | 1/12 | 1/12 | 1/12 | 1/12 |
| 1 | 0 | ⅛ | ⅛ | ⅛ | ⅛ |
|   | 1 | 1/12 | 1/12 | 1/12 | 1/12 |
| 2 | 0 | ⅛ | ⅛ | 1/24 | 1/24 |
|   | 1 | 1/12 | 1/12 | 1/12 | 1/12 |

TABLE 1 (c)

| Ci | B(i, m, n) | A9 (i, m, n) | A10(i, m, n) | A11 (i, m, n) | A12(i, m, n) |
|---|---|---|---|---|---|
| 0 | 0 | 0 | 0 | 0 | 0 |
|   | 1 | 1/12 | 1/12 | 1/12 | 1/12 |
| 1 | 0 | 0 | 0 | 0 | 0 |
|   | 1 | 1/12 | 1/12 | 1/12 | 1/12 |
| 2 | 0 | 1/24 | 1/24 |   |   |

TABLE 1 (c)-continued

| Ci | B(i, m, n) | A9 (i, m, n) | A10(i, m, n) | A11 (i, m, n) | A12(i, m, n) |
|---|---|---|---|---|---|
| 1 | 1/12 | 1/12 | 1/12 | 1/12 | 1/12 |

It is to be noted in connection with the prediction coefficients that the current picture element is predicted with an adversely affected reliability if a relatively great value were given to the prediction coefficients for use in relation to the picture elements which are remote, as exemplified by the ninth through the twelfth picture elements S(9) to S(12) depicted in FIG. 3, from the current picture element S(0) in a high contrast picture. On the contrary, the current picture element S(0) is predicted with a high reliability when a relatively great value is used as the prediction coefficients in relation to the picture elements which are remote from the current picture element in a lower contrast picture, such as from the current picture element in the background region of any one of the high through the low contrast pictures.

In order to describe the prediction coefficients a little more quantatively, attention will be directed at first to the first picture element S(1) depicted in FIG. 3. The first picture element is represented by one of the preceding (signal) elements that next precedes the current element in the signal block. The first picture element is a typical one of near (picture) elements which are near to the current picture element in one of the block areas that includes the current picture element under consideration. The second through the fourth picture elements S(2) to S(4) may also be near elements. When used in connection with the preceding elements representative of such near elements, the prediction coefficients will be called near coefficients. On the contrary, the prediction coefficients will be termed remote coefficients when used in connection with the preceding elements representative of the picture elements which are remote from the current picture element as is the case with the ninth through the twelfth picture elements.

It is preferred that the picture encoding parameter determiner 72 should determine the near and the remote coefficients with reference to the contrast stages and the background difference so that the near and the remote coefficients have a substantially common value when the level difference is the background difference. The near coefficient or coefficients should be greater than the remote coefficients when the level difference is greater than the preselected difference D, namely, when the current picture element is in the picture region. The near coefficients have different values depending on the stages of contrast and comprise a smaller and a greater coefficient when the level difference is higher and lower than the predetermined difference, namely, when the current picture element is in a block area of a higher and a lower contrast picture, respectively.

Referring again to FIG. 4, the description will proceed to a picture signal encoding device according to a third general embodiment of this invention and to a counterpart picture signal decoding device. The encoding and the decoding devices comprise similar parts which are designated by like reference numerals and are similarly operable with likewise named signals. It should, however, be noted that an element or inter-element contrast detecting unit 41' (presently illustrated) is substituted for the block or inter-block contrast detecting unit 41.

Figure 14:
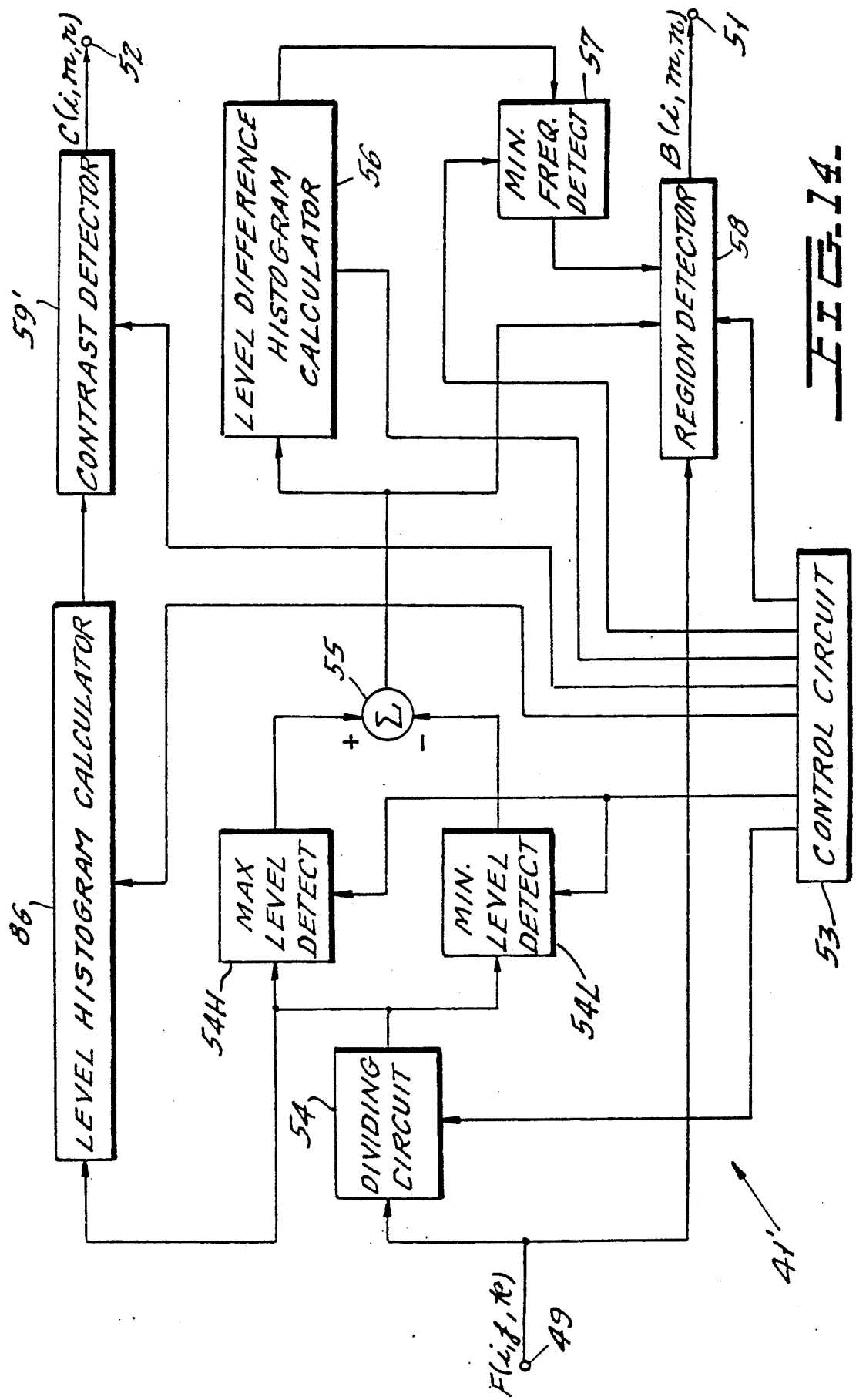
FIG. 14 is a block diagram of an element contrast detecting unit for use in a picture signal encoding device according to a third general embodiment of this invention.

Turning to FIG. 14, the element contrast detecting unit 41' is not much different from the block contrast detecting unit 41 illustrated with reference to FIG. 6 and comprises similar parts which are designated by like reference numerals and are similarly operable with likewise named signals. An element contrast detector 59' is, however, substituted for the block contrast detector 59 and is connected to a level histogram calculator 86 rather than to the level difference histogram calculator 56. Furthermore, the element contrast detector 59' is controlled by the clock and the synchronization signals. The level histogram calculator 86 is supplied from the dividing circuit 54 with each signal block of the original picture signal F(i, j, k).

Controlled by the clock and the synchronization signals, the level histogram calculator 86 delivers a level histogram signal to the element contrast detector 59'. The level histogram signal represents a level frequency distribution of levels V of the respective signal elements in each signal block of the original picture signal. In other words, the level frequency distribution represents the number of picture elements in each block area versus the levels of the signal elements representative of the respective picture elements.

Referring to FIG. 15 in addition to FIG. 14, a level frequency distribution curve is depicted for a signal block which represents a certain block area of an original picture. A predetermined frequency F is selected in common to the signal blocks of the original picture signal. When the original picture signal has one of sixteen levels at a time in the manner described before as a numerical example, the predetermined frequency may be five signal or picture elements. The level frequency distribution curve crosses the predetermined frequency at least at two points.

For each signal block, the element contrast detector 59' finds minimum and maximum levels V(1) and V(2) at which the level frequency distribution curve rises from a lower frequency to a higher frequency and falls from the higher frequency to the lower frequency. A contrast ratio W is calculated in accordance with:

$$W = [V(2) - V(1)]/[V(2) + V(1)].$$

For the element contrast detector 59', first and second ratios W(1) and W(2) are predetermined. By way of example, the first and the second ratios may be 0.7 and 0.4. When the contrast ratio is greater than the first ratio, the contrast detector 59' judges that a high contrast stage is had among the picture elements of the block area represented by the signal block in question. When the contrast ratio is smaller than the second ratio, the contrast detector 49' judges that a low contrast stage is had among the picture elements under consideration. Otherwise, the contrast detector 59' judges that an intermediate contrast stage is had by these picture elements. When a block area has a relatively high contrast, the minimum and the maximum levels are one and fourteen levels. When a block area has a relatively low contrast, the minimum and the maximum levels are three and thirteen levels.

Reviewing FIG. 14, a primary portion of the element contrast detecting unit 41' serves as an element or inter-element contrast detecting circuit. In the contrast detecting circuit, the level histogram calculator 86 serves as a level detecting circuit responsive to each of the signal blocks for detecting levels of the respective signal elements of the signal block under consideration. The element contrast detector 59' is coupled to the level detecting circuit to detect a measure of contrast among the picture element of a block area in compliance with the levels detected in one of the signal blocks that represents the block area in question. The measure is variable from one of the signal blocks to another of the signal blocks in a predetermined number of stages. The element contrast detector 59' thereby supplies the second output terminal 52 with an element or inter-element contrast signal C(i, m, n) which indicates the stages of contrast for the respective signal blocks or block areas.

As before, the high, the intermediate, and the low stages of contrast are indicated by the values 0, 1, and 2. It is now clearly understood that an original picture may comprise block areas of the high through the low contrast stages and of the background region. The foregoing description applies to the picture signal encoding device comprising the element contrast detecting unit 41' provided that the level differences in the respective signal blocks are read as the levels of the respective signal elements except for the level differences mentioned in connection with the region identifying circuit. The foregoing description applies also to the picture signal decoding device for use as the counterpart of the encoding device which comprises the element contrast detecting unit 41'.

When the element contrast detecting unit 41' is used in FIG. 4, the element contrast signal is used instead of the block contrast signal in controlling the high through the low contrast picture encoders 42 to 44 and the first multiplexer 46. By the picture contrast decoder 66, a decoded contrast signal is produced in correspondence to the element contrast signal.

When the element contrast detecting unit 41' is used in each of FIGS. 9, 10, and 13, the picture encoding parameter determiner 72 determines the quantization step sizes and either the selection threshold values or the prediction coefficients with reference to the region identification signal and the element contrast stage signal. Supplied with the decoded region and contrast signals from the picture contrast decoder 66, the picture decoding parameter determiner 77 determines the picture decoding parameters. Various values of the picture encoding parameters described before in conjunction with FIGS. 10 and 13, are equally well applicable.

Figure 16:
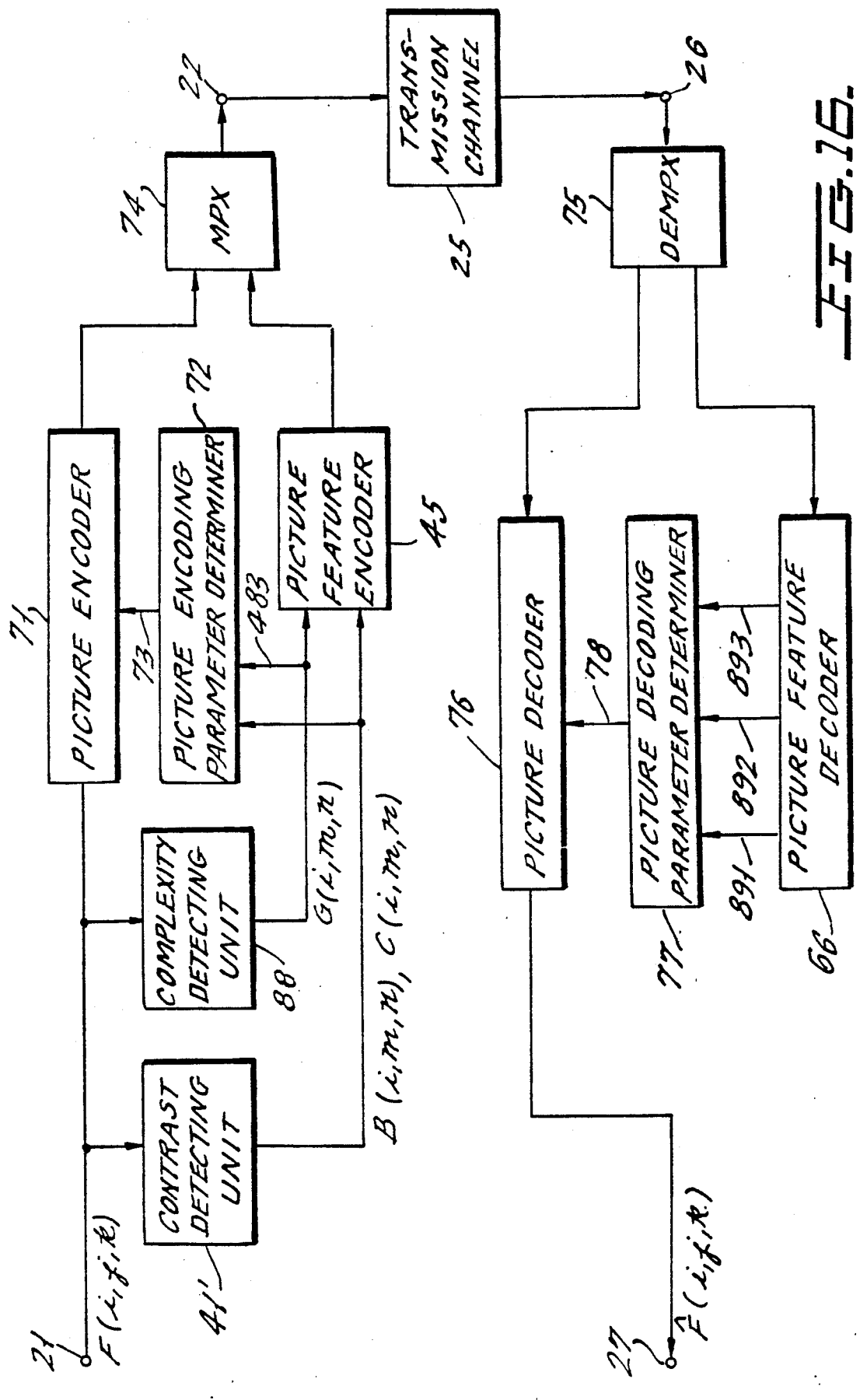
FIG. 16 is a block diagram which shows a picture signal encoding device according to a fourth general embodiment of this invention and a counterpart picture signal decoding device.

Referring now to FIG. 16, the description will proceed to a picture signal encoding device according to a fourth general embodiment of this invention and to a counterpart picture signal decoding device. The encoding and the decoding devices are similar in structure to those illustrated with reference to FIG. 9 and comprise similar parts which are again designated by like reference numerals and are similarly operable with likewise named signals.

In addition to the element or inter-element contrast detecting unit 41', a complexity detecting unit 88 is used in controlling the picture encoding parameter determiner 72 through a third connection 483. In the example being illustrated, the complexity detecting unit 88 is supplied with the original picture signal F(i, j, k) from the encoding device input terminal 21. In practice, the complexity detecting unit 88 is responsive to each signal block representative of a block area and produces a complexity grade signal G(i, m, n) in the manner which will presently be described. The picture contrast encoder is now called a picture feature encoder, which is designated by the reference numeral 45. Similarly, a picture feature decoder is designated by the reference numeral 66 and supplies the picture decoding parameter determiner 77 with the decoded region and contrast signals through first and second leads 891 and 892 and furthermore through a third lead 893 with a decoded complexity signal which corresponds to the complexity grade signal.

Figure 17:
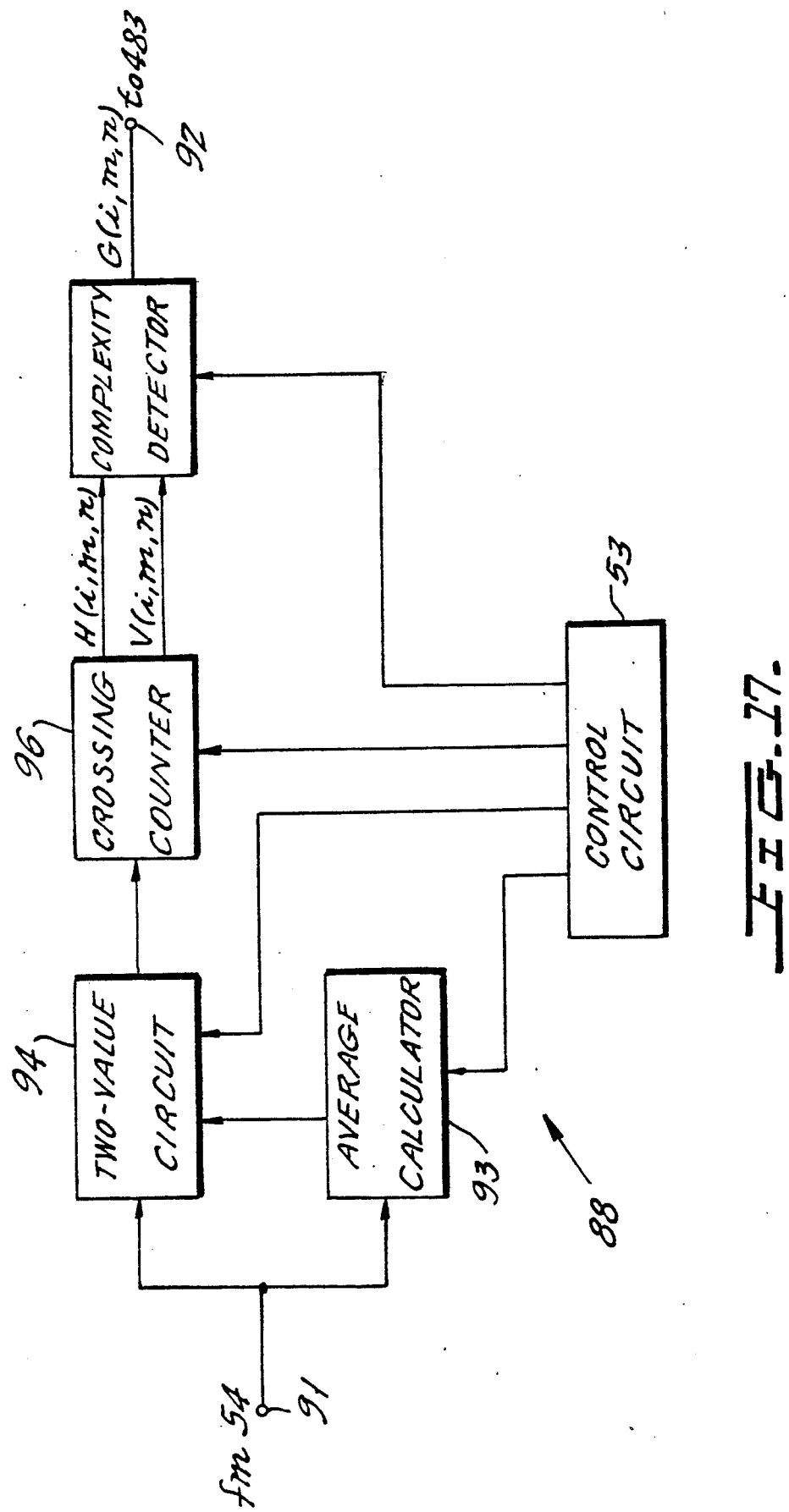
FIG. 17 is a block diagram of a complexity detecting unit for use in the encoding device illustrated in FIG. 16.

Turning to FIG. 17, the complexity detecting unit 88 has unit input and output terminals 91 and 92. The unit input terminal 91 is supplied from the dividing circuit 54 with the signal blocks of the original picture signal. The unit output terminal 92 is for delivering the complexity grade signal G(i, m, n) to the third connection 483. The control circuit 53 is depicted again in the figure merely for convenience of description.

Controlled by the clock and the synchronization signals, an average calculator 93 calculates an average of levels of the respective signal elements of each signal block to produce an average signal representative of the average. Controlled by the average signal and by the clock and the synchronization signals and supplied with the signal block under consideration, a two-value circuit 94 produces a two-value signal which is variable between a high and a low level above and below the average.

A crossing counter 96 includes a memory (not shown), in which the two-value signal is stored in response to the clock and the synchronization signals as a memory signal in accordance with the rows and the columns of the picture elements of the block area represented by the signal block. More particularly, the memory signal represents the high and the low levels of the two-value signal when the memory is read either horizontally along the successive rows or vertically along the successive columns by the clock and the synchronization signals. With the memory read horizontally and vertically, the crossing counter 96 calculates a horizontal count H(i, m, n) and a vertical count V(i, m, n) of crossings, respectively. Each of the horizontal and the vertical counts represents the number of change between the high and the low levels and varies from one of the signal blocks to another.

Supplied with signals representative of the horizontal and the vertical counts and controlled by the clock and the synchronization signals, a complexity detector 97 detects the greater one of the horizontal and the vertical counts. A comparison threshold value is predetermined for the complexity detector 97. When each block area consists of 16×16 picture elements, the comparison threshold value may be equal to seventy-seven. When the greater one of the horizontal and the vertical counts is greater than the comparison threshold value, the complexity detector 97 judges that a high grade of complexity is had by the block area represented by the signal block being dealt with. Otherwise, the complexity detector 97 judges that a low grade of complexity is had by the block area in question. The complexity detector 97 thereby delivers the complexity grade signal to the unit output terminal 92.

It is now understood that a combination of the average calculator 93 and the two-value circuit 94 serves as a level detecting circuit of a sort and detects the levels of the respective signal elements of each signal block. Another combination of the crossing counter 96 and the complexity detector 97 serves as a complexity detecting circuit coupled to the last-mentioned level detecting circuit for detecting a degree of complexity in each block area in compliance with the levels detected in one of the signal blocks that represents the block area in question. The degree of complexity is variable from one of the block areas to another of the block areas in a predestined or prescribed number of grades. The complexity grade signal indicates the grades of complexity for the respective block areas or signal blocks. When the predestined number is equal to two, the complexity grade signal represents a high and a low grade of complexity by values 0 and 1.

Referring to FIG. 18, attention will be directed to a picture signal encoding device according to a third practical embodiment of this invention and to a counterpart picture signal decoding device. The encoding and the decoding devices are similar in structure to those illustrated with reference to FIG. 10 and comprise similar parts which are designated by like reference numerals and are similarly operable with likewise named signals. The decoded region, contrast, and complexity signals are labelled $B(i, m, n)$, $C(i, m, n)$, and $G(i, m, n)$.

Figure 19:
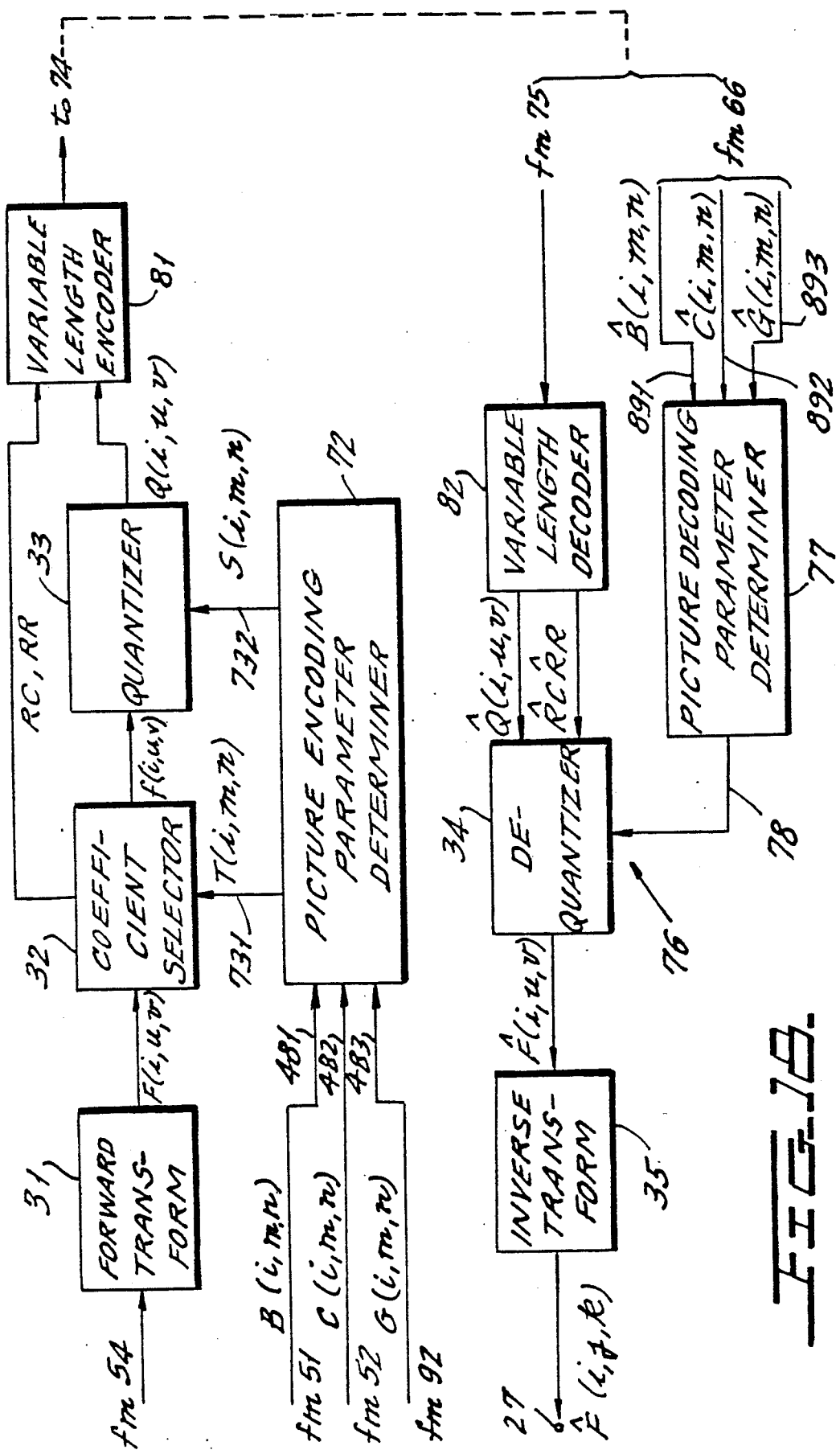
FIG. 19 is a block diagram of portions of a picture signal encoding device according to a fourth practical embodiment of this invention and of a counterpart picture signal decoding device.
Figure 19:
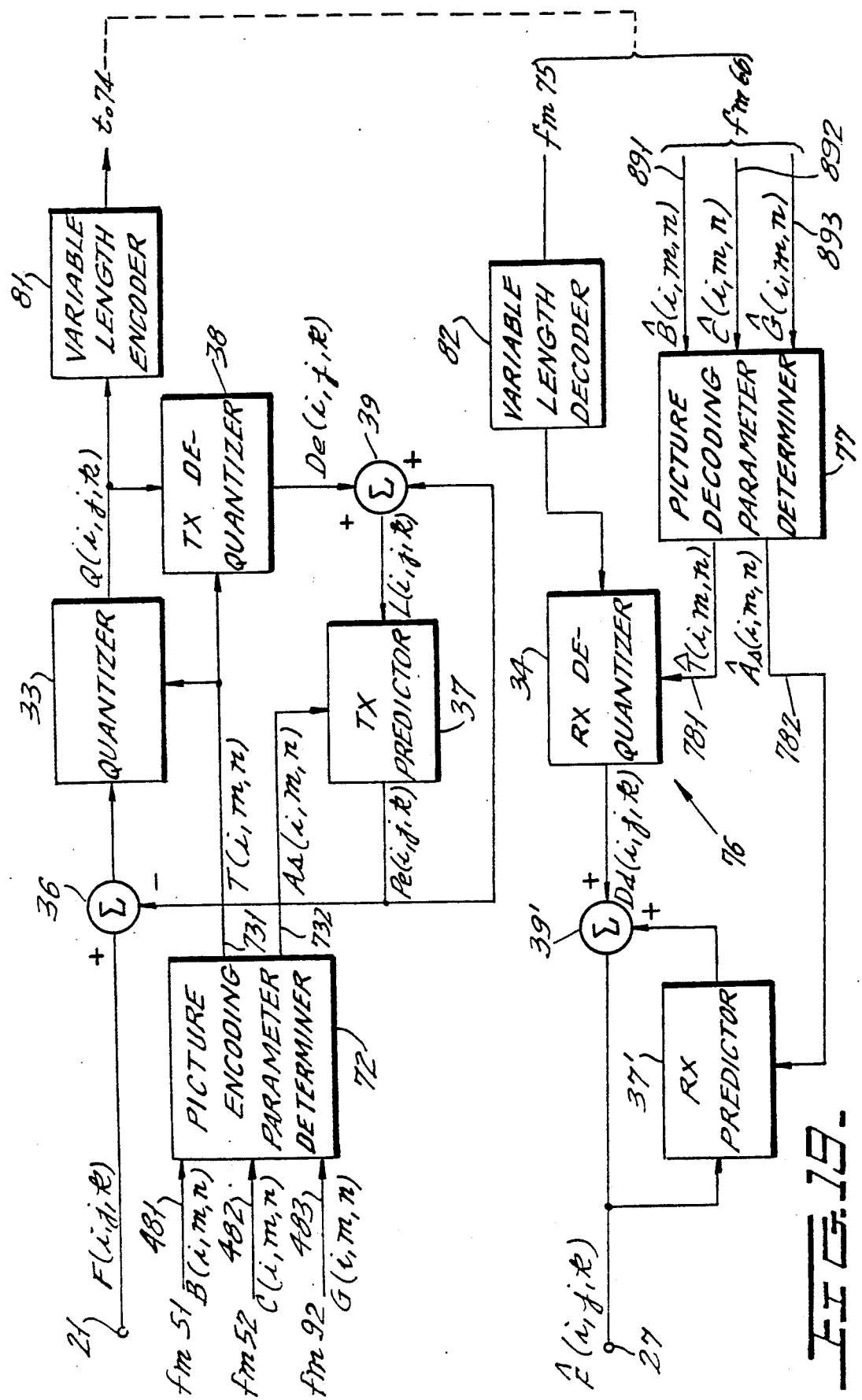

Referring finally to FIG. 19, attention will be directed to a picture signal encoding device according to a fourth practical embodiment of this invention and to a counterpart picture signal decoding device. The encoding and the decoding devices are similar in structure to those illustrated with reference to FIG. 13 and comprise similar parts which are again designated by like reference numerals and are similarly operable with likewise named signals.

In connection with FIGS. 18 and 19, it should be understood that the background region has the low contrast stage and the low complexity grade and that the block area of each of the high through the low contrast stages may have either the high or the low complexity grade. Each signal block or block area therefore belongs to one of seven types which are defined by the background difference and six combinations of the three contrast stages and the two complexity grades.

In consideration of the seven types, the picture encoding parameter determiner 72 determines seven quantization step sizes which may be denoted by $Z(0)$, $Z(1)$, $Z(1')$, $Z(2)$, $Z(2')$, $Z(3)$, and $Z(3')$ merely for convenience of description. Among these seven quantization step sizes, the step size $Z(0)$ is a smallest step size. The step size $Z(1)$ is greater than the smallest step size and is smaller than the step size $Z(2)$. The step size $Z(2)$ is smaller than the step size $Z(3)$. This applies to the step sizes represented by addition of a prime to each numeral. The step size without the prime is smaller than the step size with the prime added to the same numeral.

The smallest step size $Z(0)$ is used for each block area in the background region. The step size $Z(1)$ is used for a block area which has the low contrast stage and yet the high complexity grade. The step size $Z(1')$ is used for a block area of the low contrast and of the low complexity. The step size $Z(2)$ is used for a block area of the intermediate contrast and of the high complexity. The step size $Z(2')$ is used for a block area of the intermediate contrast and of the low complexity. The step size $Z(3)$ is used for a block area of the high contrast and of the high complexity. The step size $Z(3')$ is used for a block area of the high contrast and of the low complexity.

More in general, the picture encoding parameter determiner 72 determines a plurality of quantization step sizes with reference to the contrast stages, the complexity grades, and the background difference. The quantization step sizes comprise a smallest step size $Z(0)$, a smaller step size, typically the step size $Z(1)$, and a greater step size, such as the step size $Z(3')$. The smallest step size is used when the level difference in each signal block is the background difference indicated by the region identification signal. The smaller step size is used either when the contrast stage is low or when the complexity grade is high. The greater step size is used either when the contrast is high or when the complexity is low. This makes it possible to reduce the encoding distortion, such as the block distortion for the encoding device depicted in FIG. 18 and the granular noise for the encoding device illustrated in FIG. 19, and to give an excellent picture quality to the reproduced pictures.

For the encoding device of FIG. 18, seven selection threshold values are determined and may be denoted by $T(0)$, $T(1)$, $T(1')$, $T(2)$, $T(2')$, $T(3)$, and $T(3')$. Among these selection threshold values, the threshold value $T(0)$ is a greatest threshold value. The threshold value $T(1')$ is smaller than the greatest threshold value and is greater than the threshold value $T(2')$. The threshold value $T(2')$ is greater than the threshold value $T(3')$. This applies to the threshold values represented without addition of a prime to each numeral. The threshold value with the prime is greater than the threshold value without the prime.

The greatest threshold value $T(0)$ is used for each block area in the background region. The threshold value $T(1)$ is used for a block area which has the high contrast and furthermore the high complexity. The threshold value $T(1')$ is used for a block area of the high contrast and yet of the low complexity. The threshold value $T(2)$ is used for a block area of the intermediate contrast and of the high complexity. The threshold value $T(2')$ is used for a block area of the intermediate contrast and of the low complexity. The threshold value $T(3)$ is used for a block area of the low contrast and of the high complexity. The threshold value $T(3')$ is used for a block area of the low contrast and of the low complexity.

More in general, the picture encoding parameter determiner 72 determines a plurality of selection threshold values with reference to the contrast stages, the complexity grades, and the background difference. The selection threshold values comprise a greatest threshold value $T(0)$, a greater threshold value, typically $T(1')$, and a smaller threshold value, such as $T(3)$. The greatest threshold value is used for each block area in the background region. The greater and the smaller threshold values are used either when the contrast stages are for a first high level and a first low level relative to each other or when the complexity grades are for a second low level and a second high level relative to each other, respectively. This makes it possible to reduce the block distortion and the like encoding distortion difficult to perceive and to give an excellent picture quality to the reproduced pictures.

For the encoding device of FIG. 19, the picture encoding parameter determiner 72 determines seven sets of first through twelfth prediction coefficients with reference to the contrast stages, the complexity grades, and the background difference. The prediction coefficients of each set are for use in Equation (3) as coefficients for the first through the twelfth picture elements $S(1)$ to $S(12)$. Among the seven prediction coefficient sets, one set is used for each block area in the background region. The above-defined near and remote coefficients of this set have a substantially common value in the manner described in relation to Table 1. Six other prediction coefficient sets are listed in Table 2 given in four parts (a) through (d). The near and the remote coefficients are determined as described in connection with Table 1. Such prediction coefficient sets make it possible to reduce the granular noise and the like encoding distortion and to give the reproduced pictures an excellent picture quality.

TABLE 2 (a)

| C(i, m, n) | G(i, m, n) | A1(i, m, n) | A2(i, m, n) | A3(i, m, n) |
|---|---|---|---|---|
| 0 | 0 | 1.0 | 0 | 0 |
|   | 1 | 0.5 | 0.5 | 0 |
| 1 | 0 | 0.3 | 0.3 | 0.2 |
|   | 1 | 0.25 | 0.25 | 0.15 |
| 2 | 0 | 0.20 | 0.20 | 0.15 |
|   | 1 | 0.125 | 0.125 | 0.125 |

TABLE 2 (b)

| C(i, m, n) | G(i, m, n) | A4(i, m, n) | A5(i, m, n) | A6(i, m, n) |
|---|---|---|---|---|
| 0 | 0 | 0 | 0 | 0 |
|   | 1 | 0 | 0 | 0 |
| 1 | 0 | 0.2 | 0 | 0 |
|   | 1 | 0.15 | 0.10 | 0.10 |
| 2 | 0 | 0.15 | 0.10 | 0.10 |
|   | 1 | 0.125 | 0.075 | 0.075 |

TABLE 2 (c)

| C(i, m, n) | G(i, m, n) | A7(i, m, n) | A8(i, m, n) | A9(i, m, n) |
|---|---|---|---|---|
| 0 | 0 | 0 | 0 | 0 |
|   | 1 | 0 | 0 | 0 |
| 1 | 0 | 0 | 0 | 0 |
|   | 1 | 0 | 0 | 0 |
| 2 | 0 | 0.05 | 0.05 | 0 |
|   | 1 | 0.075 | 0.075 | 0.05 |

TABLE 2 (d)

| C(i, m, n) | G(i, m, n) | A10(i, m, n) | A11(i, m, n) | A12(i, m, n) |
|---|---|---|---|---|
| 0 | 0 | 0 | 0 | 0 |
|   | 1 | 0 | 0 | 0 |
| 1 | 0 | 0 | 0 | 0 |
|   | 1 | 0 | 0 | 0 |
| 2 | 0 | 0 | 0 | 0 |
|   | 1 | 0.05 | 0.05 | 0.05 |

While this invention has thus far been described in specific conjunction with several preferred embodiments thereof, it will now be readily possible for one skilled in the art to implement several points of the embodiment in practice. For example, the block and the element contrast detectors 59 and 59' and the complexity detector 97 are readily implemented by a microprocessor. Numeral values are readily selected for the quantization step sizes and the selection threshold values. Furthermore, it will be readily possible for one skilled in the art to carry this invention into effect in various other manners. For example, the complexity detecting unit 88 can be included in the picture signal encoding device illustrated with reference to FIG. 4. The original picture signal may be a monochrome or a color television signal. Above all, it is possible to divide the contrast measures and the complexity degrees into other numbers of stages and grades, such as four stages and four grades. Even when the complexity grades are three or more in number, the two-value circuit 94 is used equally as well in the complexity detecting unit 88.

What is claimed is:

1. A picture signal encoding device for encoding an original picture signal comprising signal portions representative of original pictures, respectively, said encoding device including dividing means for dividing each signal portion into signal blocks and a picture encoder for encoding said signal blocks into an encoded picture signal, said signal blocks representing block areas of a common size in each original picture, respectively, wherein the improvement comprises:

contrast detecting means responsive to said signal blocks for detecting a measure of contrast in each original picture, said measure being variable from a measure to another measure in a predetermined number of stages, said detecting means thereby producing a contrast stage signal indicative of said stages;

wherein said contrast detecting means comprises:

level difference detecting means responsive to said signal blocks for detecting a level difference between a maximum and a minimum level in each of said signal blocks, said level difference being variable from one of said signal blocks to another of said signal blocks; and block contrast detecting means coupled to said level difference detecting means for detecting the measures of contrast among the block areas of each original picture in compliance with the level differences detected in each signal portion to make said contrast stage signal indicate said stages for the respective signal portions;

determining means responsive to said contrast stage signal for determining encoding parameters with reference to said stages;

supplying means for supplying said encoding parameters to said picture encoder to make each of said encoding parameters give said picture encoder a predetermined encoding characteristic;

encoding means for encoding said contrast stage signal into an encoded contrast signal; and combining means for combining said encoded picture signal and said encoded contrast signal into a device output signal.

2. A picture signal encoding device as claimed in claim 1, said stages becoming a low stage when said level difference is lower than a predetermined difference;

said encoding device further comprising region identifying means coupled to said level difference detecting means for identifying a background region and a picture region with reference to the level differences detected in said original picture signal, said picture region being represented by the signal block having the level difference greater than a preselected difference which is lower than said predetermined difference, said background region being represented by the signal block which has the level difference smaller than said preselected difference as a background difference, said region identifying means thereby producing a region identification signal indicative of said background and said picture regions for the respective signal blocks of said original picture signal;

said determining means being responsive to said contrast stage signal and said region identification signal for determining said encoding parameters with reference to said stages and said background difference;

said encoding means being for furthermore encoding said region identification signal into an encoded region signal;

said combining means being for combining said encoded picture signal, said encoded contrast signal, and said encoded region signal into said device output signal.

3. A picture signal encoding device as claimed in claim 2, said picture encoder comprising a transformer for subjecting the signal blocks of each signal portion to linear transform to provide transform coefficients, a coefficient selector for selecting selected coefficients from said transform coefficients, and a coefficient encoder for encoding said selected coefficients into said encoded picture signal, wherein:

said determining means is for determining a plurality of selection threshold values with reference to said stages and said background difference, said selection threshold values comprising a greatest threshold value, a greater threshold value, and a smaller threshold value when said level difference is said background difference and higher and lower than said predetermined difference, respectively;

said supplying means being for supplying said selection threshold values to said coefficient selector for use in selecting said selected coefficients.

4. A picture signal encoding device as claimed in claim 3, said coefficient encoder comprising a quantizer for quantizing said selected coefficients into a quantization step level number signal and a level number signal encoder for encoding said level number signal into said encoded picture signal, wherein:

said determining means is for additionally determining a plurality of quantization step sizes with reference to said stages and said background difference, said quantization step sizes comprising a smallest step size, a smaller step size, and a greater step size when said level difference is said background difference and is higher and lower than said predetermined difference, respectively;

said supplying means being for supplying said quantization step sizes to said quantizer for use in quantizing said selected coefficients into said quantization level number signal.

5. A picture signal encoding device as claimed in claim 2, each of said signal blocks consisting of signal elements representative of picture elements of one of said block areas that is represented by said each of the signal blocks, said picture encoder comprising a prediction circuit responsive to a plurality of preceding elements preceding a current element among said signal elements for producing a predicted signal predictive of said current element in compliance with a predetermined prediction formula defined by a plurality of prediction coefficients for the respective preceding elements, and a signal encoder for encoding said predicted signal into said encoded picture signal, wherein:

said determining means is for determining near and remote coefficients with reference to said stages and said background difference, said near and said remote coefficients being for use in said prediction formula for near and remote elements which are represented by the respective preceding elements near to and remote from, in said one of the block areas, the picture element represented by said current element, said near and said remote coefficients having a substantially common value when said level difference is said background difference, said near coefficients being greater than said remote coefficients when said level difference is greater than said preselected difference, said near coefficients comprising a smaller and a greater coefficient when said level difference is greater and smaller than said predetermined difference, respectively, said remote coefficients comprising a smaller and a greater coefficient when said level difference is greater and smaller than said predetermined difference, respectively;

said supplying means being for supplying said near and said remote coefficients said prediction circuit as the respective prediction coefficients.

6. A picture signal encoding device as claimed in claim 5, said signal encoder comprising a quantizer for quantizing said predicted signal into a quantization step level number signal and a level number signal encoder for encoding said level number signal into said encoded picture signal, wherein:

said determining means is for additionally determining a plurality of quantization step sizes with reference to said stages and said background difference, said quantization step sizes comprising a greatest step size, a greater step size, and a smaller step size when said level difference is said background difference and is smaller and greater than said predetermined difference, respectively;

said supplying means being for supplying said quantization step sizes to said quantizer for use in quantizing said predicted signal into said quantization step level number signal.

7. A picture signal encoding device as claimed in claim 1, each of said signal blocks consisting of signal elements representative of picture elements of one of said block areas that is represented by said each of the signal blocks, wherein said contrast detecting means comprises:

level detecting means responsive to each of said signal blocks for detecting levels of the respective signal elements; and element contrast detecting means coupled to said level detecting means for detecting the measures of contrast among the picture elements of each of said block areas in compliance with the levels detected in one of said signal blocks that represents said each of the block areas, said element contrast detecting means thereby making said contrast stage signal indicate said stages for the respective signal blocks.

8. A picture signal encoding device as claimed in claim 7, further comprising:

level difference detecting means responsive to said signal blocks for detecting a level difference between a maximum and a minimum level in each of said signal blocks, said level difference being variable from one of said signal blocks to another of said signal blocks, said stages becoming a low stage when said level difference is lower than a predetermined difference; and region identifying means coupled to said level difference detecting means for idintifying a background region and a picture region with reference to the level differences detected in said original picture signal, said picture region being represented by the signal block having the level difference greater .than a preselected difference which is lower than said predetermined difference, said background region being represented by the signal block which has the level difference smaller than said preselected difference as a background difference, said region identifying means thereby producing a region identification signal indicative of said background and said picture regions for the respective signal blocks of said original picture signal;

said determining means being responsive to said contrast stage signal and said region identification signal for determining said encoding parameters with reference to said stages and said background difference;

said encoding means being for furthermore encoding said region identification signal into an encoded region signal;

said combining means being for combining said encoded picture signal, said encoded contrast signal, and said encoded region signal into said device output signal.

9. A picture signal encoding device as claimed in claim 8, said picture encoder comprising a transformer for subjecting the signal blocks of each signal portion to linear transform to provide transform coefficients, a coefficient selector for selecting selected coefficients from said transform coefficients, and a coefficient encoder for encoding said selected coefficients into said encoded picture signal, wherein:

said determining means is for determining a plurality of selection threshold values with reference to said stages and said background difference, said selection threshold values comprising a greatest threshold value, a greater threshold value, and a smaller threshold value when said level difference is said background difference and is smaller and greater than said predetermined difference, respectively;

said supplying means being for supplying said selection threshold values to said coefficient selector for use in selecting said selected coefficients.

10. A picture signal encoding device as claimed in claim 9, said coefficient encoder comprising a quantizer for quantizing said selected coefficients into a quantization step level number signal and a level number signal encoder for encoding said level number signal into said encoded picture signal, wherein:

said determining means is for additionally determining a plurality of quantization step sizes with reference to said stages and said background difference, said quantization step sizes comprising a smallest step size, a smaller step size, and a greater step size when said level difference is said background difference and is smaller and greater than said predetermined difference, respectively;

said supplying means being for supplying said quantization step sizes to said quantizer for use in quantizing said selected coefficients into said quantization step level number signal.

11. A picture signal encoding device as claimed in claim 8, said picture encoder comprising a prediction circuit responsive to a plurality of preceding elements preceding a current elements among said signal elements for producing a predicted signal predictive of said current element in compliance with a predetermined prediction formula defined by a plurality of prediction coefficients for the respective preceding elements, and a signal encoder for encoding said predicted signal into said encoded picture signal, wherein:

said determining means is for determining near and remote coefficients with reference to said stages and said background difference, said near and said remote coefficients being for use in said prediction formula for near and remote elements which are represented by the respective preceding elements near to and remote from, in said one of the picture blocks, the picture element represented by said current element, said near and said remote coefficients having a substantially common value when said level difference is said background difference, said near coefficients being greater than said remote coefficients when said level difference is greater than said preselected difference, said near coefficients comprising a smaller and a greater coefficient when said stages are for a low level and a high level relative to each other, respectively, said remote coefficients comprising another smaller and another greater coefficient when said stages are for said low level and said high level, respectively;

said supplying means being for supplying said near and said remote coefficients to said prediction circuit as the respective prediction coefficients.

12. A picture signal encoding device as claimed in claim 11, said signal encoder comprising a quantizer for quantizing said predicted signal into a quantization step level number signal and a level number signal encoder for encoding said level number signal into said encoded picture signal, wherein:

said determining means is for additionally determining a plurality of quantization step sizes with reference to said stages and said background difference, said quantization step sizes comprising a smallest step size, a smaller step size, and a greater step size when said level difference is said background difference and is small and great relative to each other, respectively;

said supplying means being for supplying said quantization step sizes to said quantizer for use in quantizing said predicted signal into said quantization step level number signal.

13. A picture signal encoding device as claimed in claim 1, each of said signal blocks consisting of signal elements representative of picture elements of one of said block areas that is represented by said each of the signal blocks, wherein:

said contrast detecting means comprises:

level detecting means responsive to each of said signal blocks for detecting levels of the respective signal elements; and element contrast detecting means coupled to said level detecting means for detecting the measures of contrast among the picture elements of each of said block areas in compliance with the levels detected in one of said signal blocks that represents said each of the block areas, said element contrast detecting means thereby making said contrast stage signal indicate said stages for the respective signal blocks;

said encoding device further comprising complexity detecting means coupled to said level detecting means for detecting a degree of complexity of each of said block areas in compliance with the levels detected in one of said signal blocks that represents said each of the block areas, said degree of complexity being variable from one of said block areas to another of said block areas in a predestined number of grades, said complexity detecting means thereby producing a complexity grade signal indicative of said grades for the respective signal blocks;

said determining means being further responsive to said complexity grade signal to determine said encoding parameters with reference to said stages and said grades;

said encoding means being for furthermore encoding said complexity grade signal into an encoded complexity signal;

said combining means being for combining said encoded picture signal, said encoded contrast signal, and said encoded complexity signal into said device output signal.

14. A picture signal encoding device as claimed in claim 13, further comprising:

level difference detecting means responsive to said signal blocks for detecting a level difference between a maximum and a minimum level in each of said signal blocks, said level difference being variable from one of said signal blocks to another of said signal blocks, said stages becoming a low stage when said level difference is lower than a predetermined difference; and region identifying means coupled to said level difference detecting means for identifying a background region and a picture region with reference to the level differences detected in said original picture signal, said picture region being represented by the signal block having the level differences greater than a preselected diifference which is lower than said predetermined difference, said background region being represented by the signal block which has the level differences smaller than said preselected difference as a background difference, said region identifying means thereby producing a region identification signal indicative of said background and said picture regions for the respective signal blocks of said original picture signal;

said determining means being responsive to said contrast stage signal, said complexity grade signal, and said region identification signal for determining said encoding parameters with reference to said stages, said grades, and said background difference;

said encoding means being for furthermore encoding said region identification signal into an encoded region signal;

said combining means being for combining said encoded picture signal, said encoded contrast signal, said encoded complexity signal, and said encoded region signal into said device output signal.

15. A picture signal encoding device as claimed in claim 14, said picture encoder comprising a transformer for subjecting the signal blocks of each signal portion to linear transform to provide transform coefficients, a coefficient selector for selecting selected coefficients from said transform coefficients, and a coefficient encoder for encoding said selected coefficients into said encoded picture signal, wherein:

said determining means is for determining a plurality of selection threshold values with reference to said stages, said grades, and said background difference, said selection threshold values comprising a greatest threshold value, a greater threshold value, and a smaller threshold value when said level difference is said background difference and either when said stages are for a first high level and a first low level relative to each other or when said grades are for a second low level and a second high level relative to each other, respectively;

said supplying means being for supplying said selection threshold values to said coefficient selector for use in selecting said selected coefficients.

16. A picture signal encoding device as claimed in claim 15, said coefficient encoder comprising a quantizer for quantizing said selected coefficients into a quantization step level number signal and a level number signal encoder for encoding said level number signal into said encoded picture signal, wherein:

said determining means is for additionally determining a plurality of quantization step sizes with reference to said stages, said grades, and said background difference, said quantization step sizes comprising a smallest step size, a smaller step size, and a greater step size when said level difference is said background difference and either when said stages are for a third low level and a third high level relative to each other or when said grades are for a fourth high level and a fourth low level relative to each other, respectively;

said supplying means being for supplying said quantization step sizes to said quantizer for use in quantizing said selected coefficients into said quantization step level, number signal.

17. A picture signal encoding device as claimed in claim 14, said picture encoder comprising a prediction circuit responsive to a plurality of preceding elements preceding a current element among said signal elements for producing a predicted signal predictive of said current element in compliance with a predetermined prediction formula defined by a plurality of prediction coefficients for the respective preceding elements, and a signal encoder for encoding said predicted signal into said encoded picture signal, wherein:

said determining means is for determining near and remote coefficients with reference to said stages, said grades, and said background difference, said near and said remote coefficients being for use in said prediction formula for near and remote elements which are represented by the respective preceding elements near to and remote from, in said one of the block areas, the picture element represented by said current element, said near and said remote coefficients having a substantially common value when said level difference is said background difference, said near coefficients being greater than said remote coefficients when said level difference is greater than said preselected difference, said near coefficients comprising a smaller and a greater coefficient when either said stages or said grades are for a first low level and a first high level relative to each other, respectively, said remote coefficients comprising another smaller and another greater coefficient when either said stages or said grades are for said first low level and said first high level, respectively;

said supplying means being for supplying said near and said remote coefficients to said prediction circuit as the respective pradiction coefficients.

18. A picture signal encoding device as claimed in claim 17, said signal encoder comprising a quantizer for quantizing said predicted signal into a quantization step level number signal and a level number signal encoder for encoding said level number signal into said encoded picture signal, wherein:

said determining means is for additionally determining a plurality of quantization step sizes with reference to said stages, said grades, and said background difference, said quantization step sizes comprising a smallest step size, a smaller step size, and a greater step size when said level difference is said background difference and either when said stages are for a second low level and a second high level relative to each other or when said grades are for a third high level and a third low level relative to each other, respectively;

said supplying means being for supplying said quantization step sizes to said quantizer for use in quantizing said predicted signal into said level number signal.

19. A picture signal decoding device for decoding a device input signal produced by a picture signal encoding device which is for encoding an original picture signal comprising signal portions representative of original pictures, respectively, and comprises: (a) dividing means for dividing each signal portion into signal blocks representative of block areas of a common size in each original picture, respectively; (b) a picture encoder for encoding said signal blocks into an encoded picture signal; (c) contrast detecting means responsive to said signal blocks for detecting a measure of contrast in each original picture, said measure being variable from a measure to another measure in a predetermined number of stages, said detecting means thereby producing a contrast stage signal indicative of said stages; (d) determining means responsive to said contrast stage signal for determining encoding parameters with reference to said stages; (e) supplying means for supplying said encoding parameters to said picture encoder to make each of said encoding parameters give said picture encoder a predetermined encoding characteristic; (f) encoding means for encoding said contrast stage signal into an encoded contrast signal; and (g) combining means for combining said encoded picture signal and said encoded contrast signal into said device input signal, said decoding device comprising:

decomposing means for decomposing said device input signal into a decomposed picture signal and a decomposed contrast signal which are reproductions of said encoded picture signal and said encoded contrast signal;

decoding means for decoding said decomposed contrast signal into a decoded contrast signal indicative of said stages;

deciding means responsive to said decoded contrast signal for deciding decoding parameters with reference to the stages indicated by said decoded contrast signal, said decoding parameters being identical with the respective encoding parameters; and a picture decoder responsive to said decoding parameters for decoding said decomposed picture signal into a reproduced picture signal representative of reproductions of the respective original pictures.

* * * * *